United States Patent
Vantrease

(10) Patent No.: US 9,649,808 B2
(45) Date of Patent: May 16, 2017

(54) THERMOFORMING MACHINE HAVING PLATEN LOCKS AND METHOD

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

(*) Notice: Subject to any disclaimer, the term of this patent is extended or adjusted under 35 U.S.C. 154(b) by 825 days.

(21) Appl. No.: 13/677,219

(22) Filed: Nov. 14, 2012

(65) Prior Publication Data

US 2013/0119584 A1    May 16, 2013

Related U.S. Application Data

(60) Provisional application No. 61/559,231, filed on Nov. 14, 2011.

(51) Int. Cl.

| | |
|---|---|
| *B29C 45/66* | (2006.01) |
| *B29C 51/20* | (2006.01) |
| *B29C 51/18* | (2006.01) |
| *B29C 51/38* | (2006.01) |
| *B29C 51/08* | (2006.01) |

(52) U.S. Cl.
CPC ............ *B29C 51/20* (2013.01); *B29C 51/18* (2013.01); *B29C 51/38* (2013.01); *B29C 51/082* (2013.01); *B29C 2791/006* (2013.01); *B29C 2791/007* (2013.01)

(58) Field of Classification Search
CPC ......... B29C 51/18; B29C 51/20; B29C 51/38; B29C 51/082; B29C 2791/006; B29C 2791/007

USPC .................. 425/190, 451.9, 595, 398, 351.6
See application file for complete search history.

(56) References Cited

U.S. PATENT DOCUMENTS

| | | | |
|---|---|---|---|
| 2,689,978 A * | 9/1954 | Roger ................. | B29C 45/6714 425/451.2 |
| 4,088,432 A * | 5/1978 | Farrell ................. | B29C 45/681 425/150 |
| 4,391,110 A | 7/1983 | Nielsen, Jr. | |
| 4,878,826 A | 11/1989 | Wendt | |
| 4,921,122 A | 5/1990 | Bornstein et al. | |
| 4,969,812 A | 11/1990 | Brown | |
| 5,002,479 A | 3/1991 | Brown | |
| 5,542,273 A | 8/1996 | Bednarz | |

(Continued)

FOREIGN PATENT DOCUMENTS

WO  PCT/US2012/065125    5/2013

*Primary Examiner* — Joseph S Del Sole
*Assistant Examiner* — Thukhanh T Nguyen
(74) *Attorney, Agent, or Firm* — Wells St. John P.S.

(57) ABSTRACT

A thermoforming machine is provided having a frame, a first platen, a second platen, a platen load shaft, and a load shaft latch. The first platen supports a first mold. The second platen supports a complementary second mold and is carried by the frame for movement toward and away from the first platen to engage and disengage with the first mold. The platen load shaft has a lock ledge with an engagement surface transverse to the load shaft. The load shaft is supported by the frame and extends between the first platen and the second platen. The load shaft latch has an engagement surface transverse to a central axis of the load shaft and is movable to engage and disengage the lock ledge transverse engagement surface. A method is also provided.

20 Claims, 38 Drawing Sheets

(56) References Cited

U.S. PATENT DOCUMENTS

| | | |
|---|---|---|
| 5,773,540 A | 6/1998 | Irwin |
| 5,799,687 A | 9/1998 | Eckel et al. |
| 5,814,185 A | 9/1998 | Chun |
| 5,819,380 A | 10/1998 | Paolercio et al. |
| 5,839,303 A | 11/1998 | Umberg et al. |
| 5,950,461 A | 9/1999 | Tsai |
| 6,019,337 A | 2/2000 | Brown |
| 6,067,886 A | 5/2000 | Irwin |
| 6,084,375 A | 7/2000 | Irwin et al. |
| 6,129,883 A | 10/2000 | Jacovich et al. |
| 6,142,763 A * | 11/2000 | Lee ................ B29C 51/18 425/398 |
| 6,200,123 B1 | 3/2001 | Mailliet et al. |
| 6,210,144 B1 | 4/2001 | Mailliet et al. |
| 6,241,509 B1 | 6/2001 | Galt et al. |
| 6,242,877 B1 | 6/2001 | Irwin et al. |
| 6,250,905 B1 | 6/2001 | Mailliet et al. |
| 6,367,851 B1 | 4/2002 | Davis |
| 6,648,624 B1 * | 11/2003 | Foor ................ B29C 51/04 425/302.1 |
| 6,926,513 B2 | 8/2005 | Schlepp |
| 7,963,758 B2 * | 6/2011 | Starkey ............ B29C 33/38 425/190 |
| 2009/0104302 A1 | 4/2009 | Irwin |

\* cited by examiner

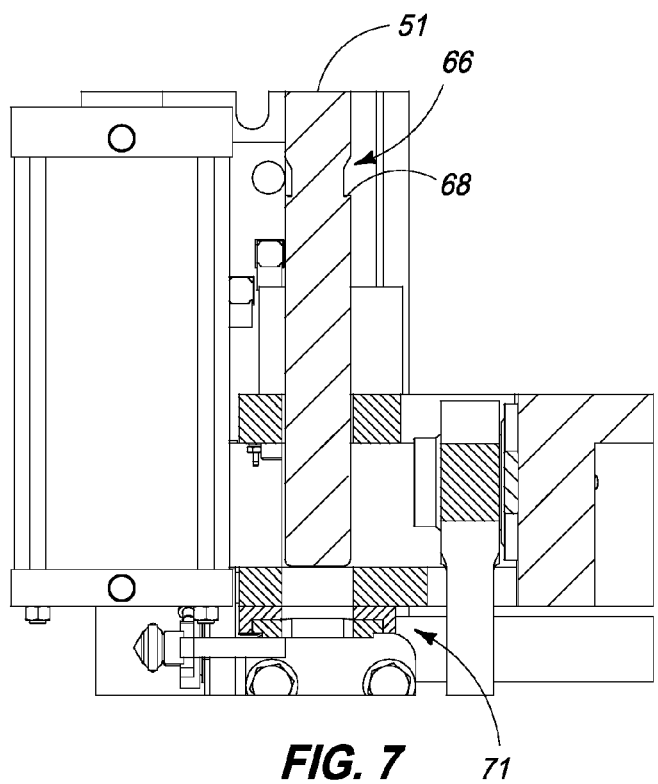
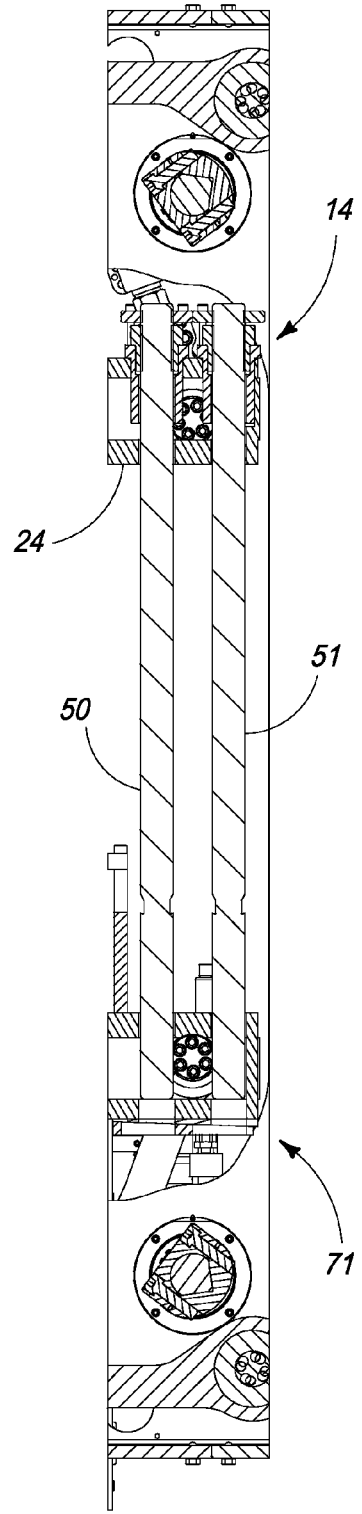
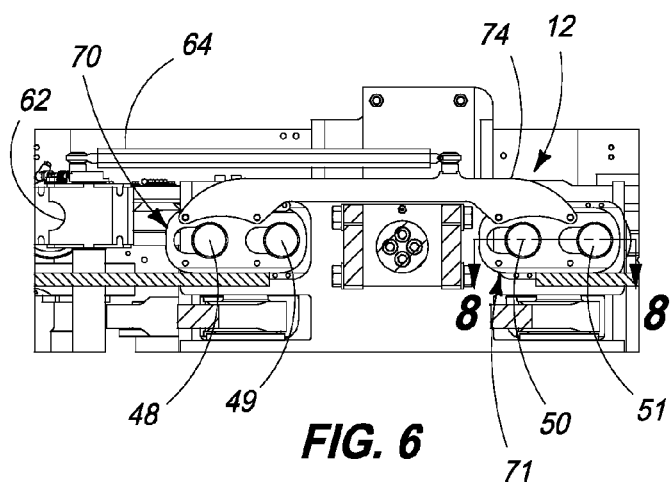
FIG. 7
FIG. 6
FIG. 8

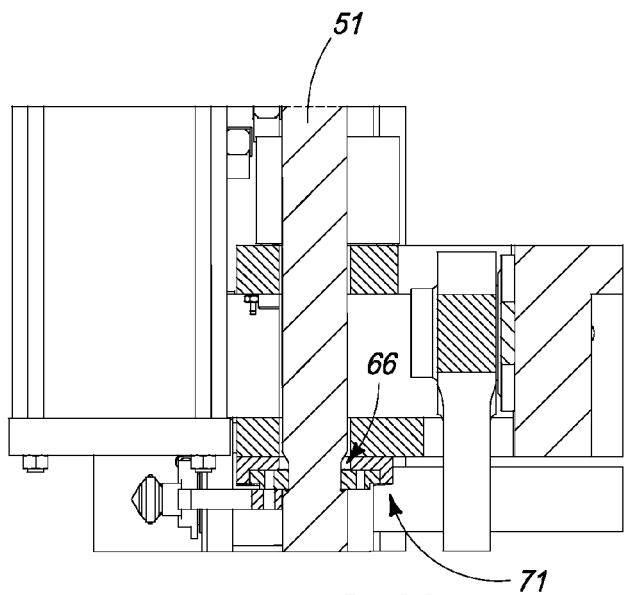
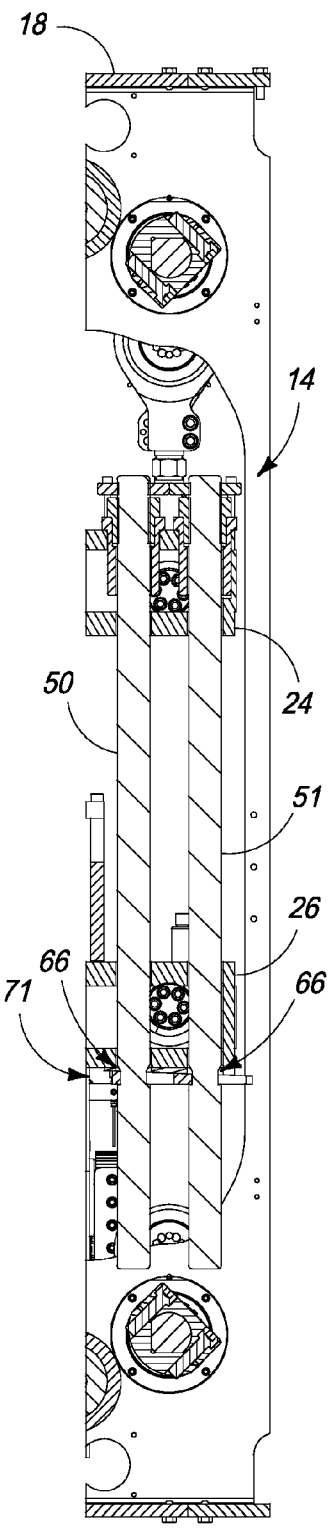
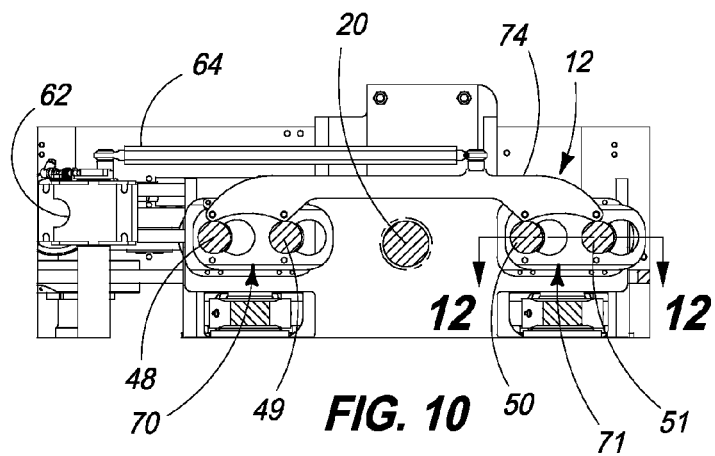
FIG. 11
FIG. 10
FIG. 12

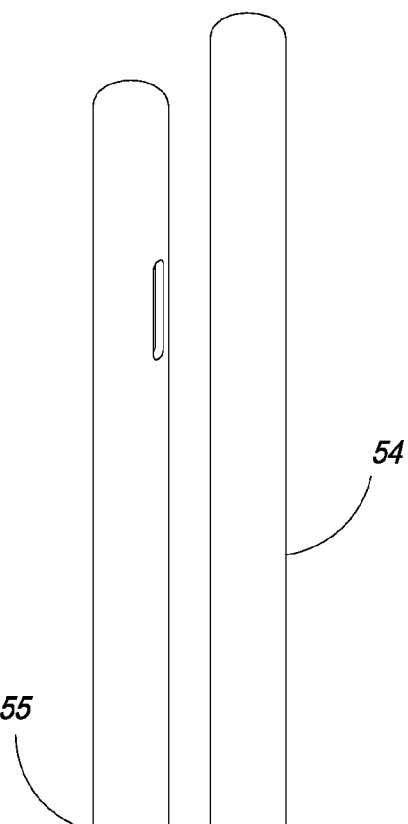
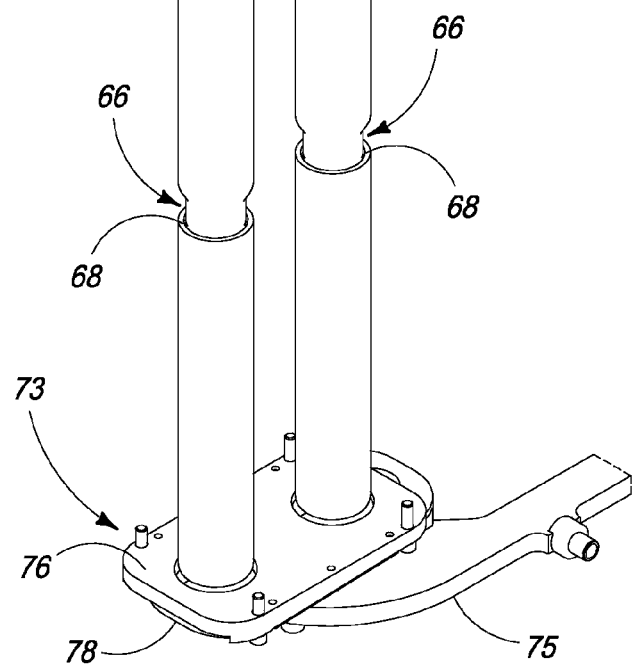
FIG. 20

THERMOFORMING MACHINE HAVING PLATEN LOCKS AND METHOD

CROSS REFERENCE TO RELATED APPLICATION

This application claims priority to U.S. Provisional Patent Application Ser. No. 61/559,231 which was filed on Nov. 14, 2011, the entirety of which is incorporated by reference herein.

TECHNICAL FIELD

This disclosure pertains generally to thermoforming apparatus. More particularly, this disclosure relates to lock or latch mechanisms for securing together opposed platens and dies when male dies are received into respective female mold cavities as pneumatic pressure is applied on a male mold side of a heated thermoformable sheeting during an article forming operation.

BACKGROUND OF THE INVENTION

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure generates very large loads on the kinematic drive linkages and frame of a thermoforming machine. Improvements are needed in order to enable very large loads without requiring further increases in the size and strength of traditional frames and linkages of a thermoforming machine, particularly when forming newer plastic sheet materials that require greater forming pressures and loads.

SUMMARY OF THE INVENTION

A thermoforming machine is provided with a platen lock mechanism that reduces a need to further increase structural load capacity of a frame and plate drive linkages on a thermoforming machine. The platen lock mechanism provides structural support to the thermoforming machine capable of handling increased thermoforming pressures on the thermoforming machine during a thermoforming operation.

According to one aspect, a thermoforming machine is provided having a frame, a first platen, a second platen, a platen load shaft, and a load shaft latch. The first platen supports a first mold. The second platen supports a complementary second mold and is carried by the frame for movement toward and away from the first platen to engage and disengage with the first mold. The platen load shaft has a lock ledge with an engagement surface transverse to the load shaft. The load shaft is supported by the frame and extends between the first platen and the second platen. The load shaft latch has an engagement surface transverse to a central axis of the load shaft and is movable to engage and disengage the lock ledge transverse engagement surface.

According to another aspect, a thermoforming machine is provided having a frame, a first platen, a second platen, a first die, a second die, a cyclical drive mechanism, a thermoforming load lock rod assembly, a manifold, a seal, and a pneumatic pressure source. The first platen is supported by the frame. The second platen is movable to-and-fro relative to the first platen. The first die is supported by the first platen. The second die is supported by the second platen. The cyclical drive mechanism is carried by the frame and is configured to move at least one of the platens to-and-fro relative to another of the platens. The thermoforming load lock rod assembly has a plurality of elongate load shafts and complementary load shaft latches configured to lock the second platen proximate the first platen during a web forming operation. The manifold is provided for receiving forming pressure between a web of material and one of the dies. The seal is provided between the web and the one die. The pneumatic pressure source is provided for delivering forming pressure to one side of heated web of thermoformable material.

According to yet another aspect, a method is provided for forming articles in a heated thermoformable web. The method includes: providing a heated thermoformable web, a pair of opposed platens each having a respective thermoforming die, a plurality of lock rod assemblies configured to lock together in engaged and sealed relation the dies, and a pneumatic pressure source; engaging together the dies in sealed relation on either side of the web by moving the platens toward one another; securing the platens by locking the plurality of lock rod assemblies to secure together in sealed relation the dies; and applying differential pneumatic pressure across opposite sides of the heated thermoformable web to form articles between the dies.

BRIEF DESCRIPTION OF THE DRAWINGS

Preferred embodiments of the disclosure are described below with reference to the following accompanying drawings.

FIG. 6 is a component view from below taken along line 6-6 of FIG. 5 and showing one side of the platen lock assembly.

FIG. 7 is a component view taken along line 7-7 of FIG. 5 and showing one lock plate assembly and load shaft in an unlocked and separated position corresponding with separation of the upper platen and lower platen.

FIG. 8 is a vertical sectional component view taken along line 8-8 of FIG. 5 and showing a pair of load shafts and corresponding lock plate in the unlocked and separated position depicted in FIG. 7.

FIG. 10 is a component view from below taken along line 10-10 of FIG. 9 and showing one side of the platen lock assembly in a locked position.

FIG. 11 is a component view taken along line 11-11 of FIG. 9 and showing one lock plate assembly and load shaft in a locked position corresponding with movement of the upper platen and lower platen to a position where die plates (not shown) would be fully engaged during a thermoforming operation.

FIG. 12 is a vertical sectional component view taken along line 12-12 of FIG. 10 and showing a pair of load shafts and corresponding lock plate in the locked and closed (die) position depicted in FIG. 9.

FIG. 20 is a component perspective view from above of the load shafts and lock plate assembly of FIGS. 16-19, but corresponding with the lock plate assembly unlocked from the lock shafts and with the upper platen and lower platen moved apart.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
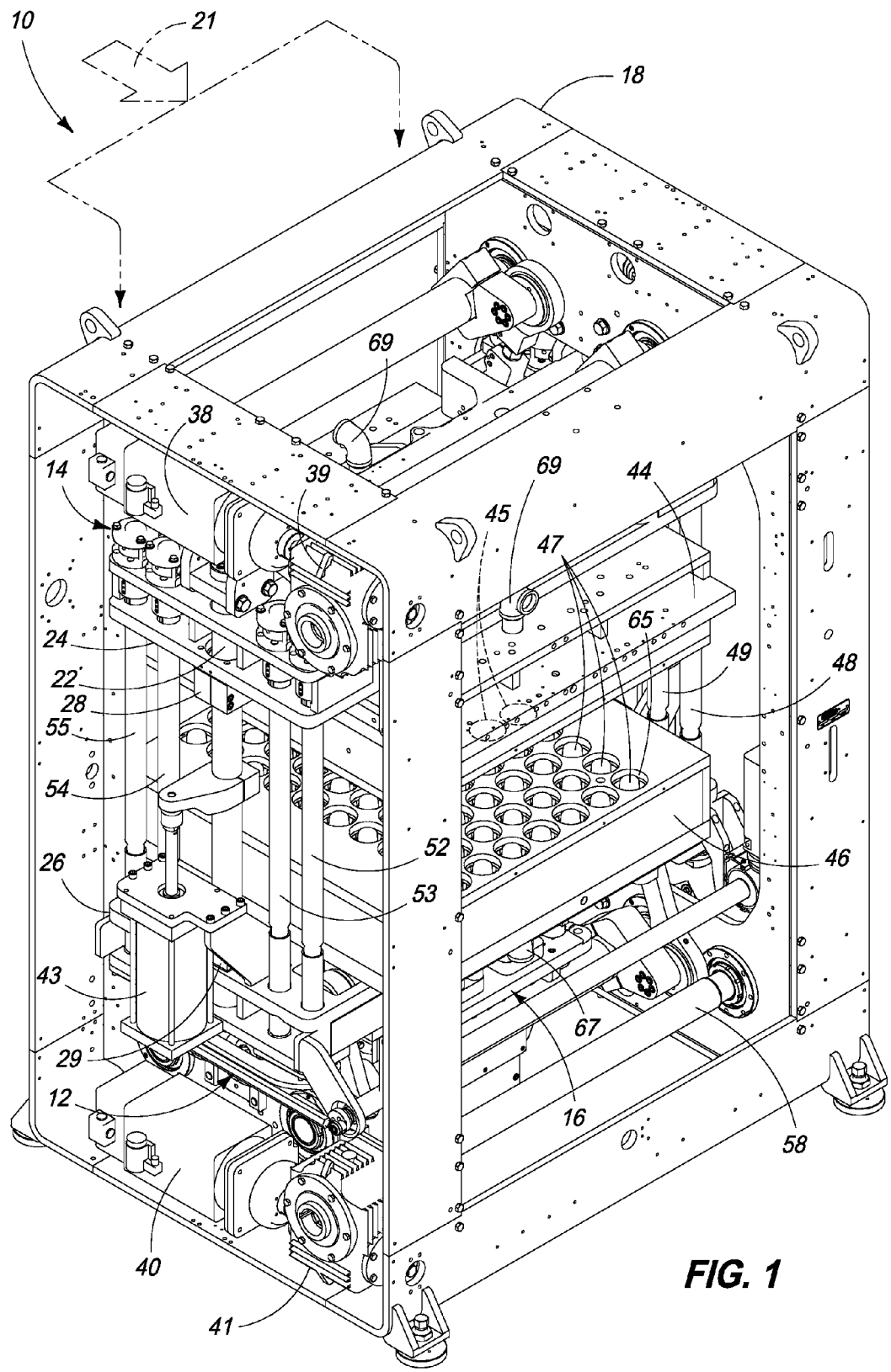
FIG. 1 is a perspective view from above of a thermoforming machine with a platen lock assembly taken from a drive motor side in accordance with an embodiment.
Figure 2:
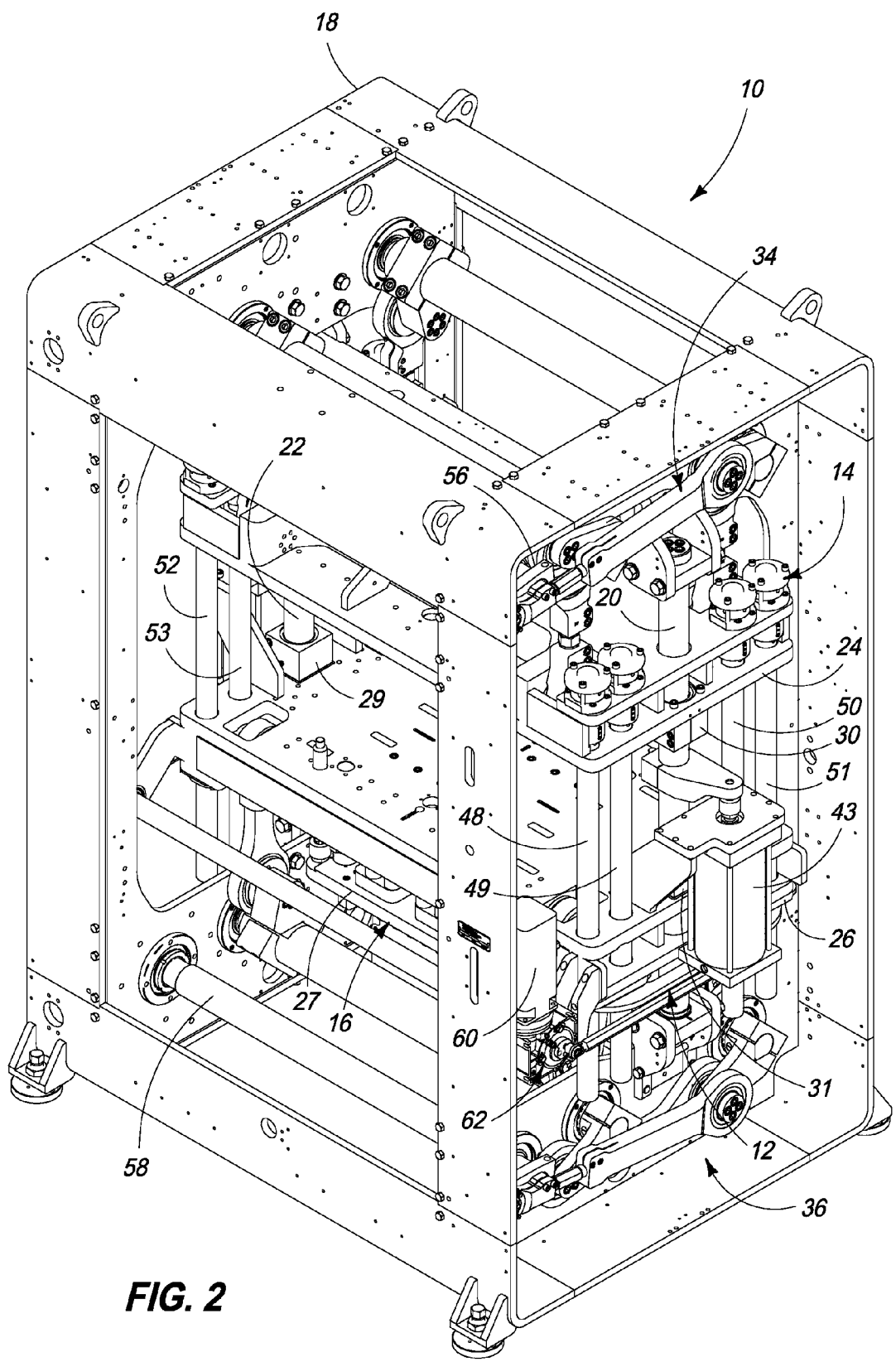
FIG. 2 is a perspective view from above of the thermoforming machine of FIG. 1 taken from a kinematic drive linkage side, and with the die plates removed.

Attention is now directed towards embodiments of the device. FIGS. 1 and 2 are left and right perspective views illustrating a thermoforming machine 10 with a platen lock assembly 12 in accordance with an embodiment. More particularly, thermoforming machine 10 includes a structural frame 18, stationary die posts 20 and 22 supported by frame 18, an upper platen 24, and a lower platen 26. Upper platen 24 and lower platen 26 are supported for vertical reciprocation via pairs of respective bronze bushings 28, 29 and 30, 31, respectively. A kinematic drive linkage drives upper platen 24 and lower platen 23 using upper kinematic linkage assembly 34 and lower kinematic linkage assembly 36, respectively, each driven by a respective servo motor 38 and 40 (see FIG. 1) via gearboxes 39 and 41, respectively. A third motion platen, or assist platen 16 is supported for movement relative to lower platen 26 by bushings that slide over respective die posts.

A set of platen load shafts 48-51 and 52-55 are provided on either side of mold plates 44 and 46, extending between upper platen 24 and lower platen 26. More particularly, platen lock assembly 12 comprises set of shafts 48-51 attached to platen 24 along a top end and lock plate assemblies 70 and 71 (see FIG. 9), as well as set of shafts 52-55 attached to platen 24 along a top end and lock plate assemblies 72 and 73 (see FIG. 13). A top end of each shaft 48-55 is mounted in vertically adjustable relation relative to top platen 24 with an adjustable rod end assembly 14, thereby enabling adjustment of each shaft when locked to lock plate assemblies 70-73 to obtain uniform engagement and fit-up between contact surfaces (and seal) between upper die plate 44 and lower die plate 46 when brought together and locked via platens 24 and 26.

As shown in FIG. 2, third motion platen 27 of plug assist drive assembly 16 is carried for reciprocating movement relative to lower platen 26 on an array of drive shafts (not shown).

As shown in FIG. 1, upper kinematic linkage assembly 34 and lower kinematic linkage assembly 35 cooperate to drive upper and lower platens 32 and 34, respectively. Respective modern rotary electric servo drive motors 38 and 40 (see FIG. 2) independently drive linkages 34 and 36 via gearboxes 39 and 41 to reciprocate platens 24 and 26 respectively. Such motors are driven by a computer control system, as is presently understood in the art. Other kinematic linkages and drive motor arrangements can be used in the alternative.

Figure 3:
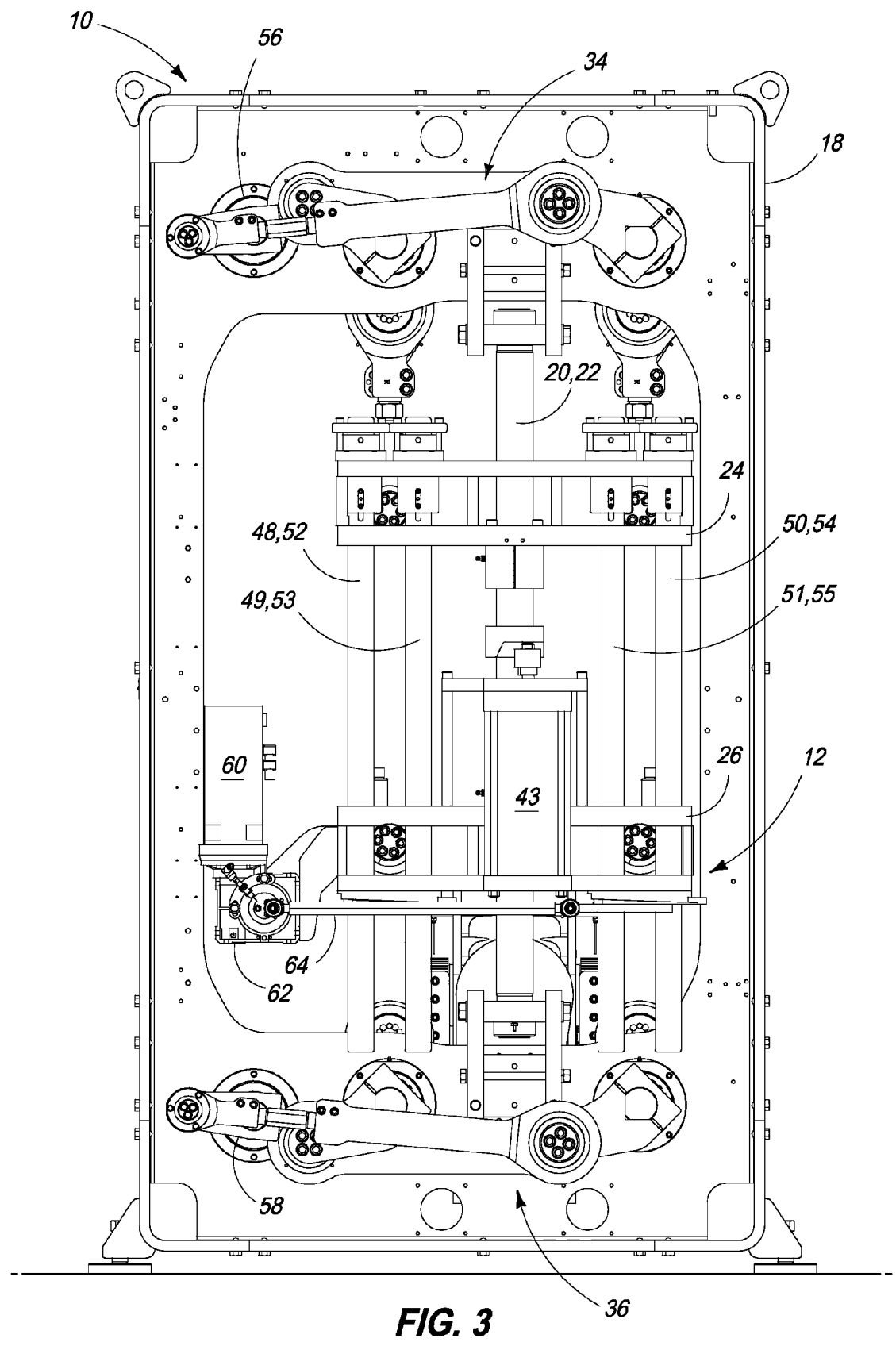
FIG. 3 is an elevational side view of the thermoforming machine of FIGS. 1-2 showing the upper and lower platens locked together in a fully closed position (but with the forming dies plates omitted).

More particularly, kinematic linkages 34 and 36 of FIG. 3 each comprise drive linkages that are formed from a pair of top and bottom crank arm assemblies, respectively. Each assembly is formed from a crank arm linkage and a four-bar linkage. The crank arm linkage drives the four-bar linkage in an oscillating motion. Each kinematic linkage 34 and 36 is driven via servo motor 38 and 40 and respective gearbox 39 and 41 through a rotary cross shaft 56 and 58, respectively. Each platen 24 and 26 is driven by kinematic linkage 34 and 36, respectively, in substantially non-rotating linear, vertical motion. Guide posts 20 and 22 further limit such motion to vertical reciprocating motion. This vertical reciprocating motion causes coacting engagement of female cavities, or female dies 45 in an upper die plate 44 mounted on the upper platen 24 with mating male dies or plugs 47 in a lower die plate 46 mounted on the lower platen 26 on opposed sides of thermoformable web, or sheet 21 (see FIG. 1).

More particularly, each drive system, including the motor and associated drive controller, forms the motor of an associated rotary press. This rotary press attaches to a rotating crank arm assembly that moves the associated four-bar linkage. The linkage causes the attached platen to move up and down in response to rotation of the drive. Accordingly, a single revolution of shafts 56 and 58 caused by drive motors 38 and 40 and gearboxes 39 and 41 will produce a corresponding complete press cycle of both the upper and lower platens 24 and 26, respectively. Hence, a complete cycle of each drive will return the press to a starting, or closed position. For example, when lower drive motor 40 is at an initial rotated position of zero degrees, the lower platen 26 is closed, or upwardly raised against the thermoformable sheet, or web. Similarly, when lower driven motor 40 is rotated to 180 degrees, the lower platen 26 is lowered, or completely opened. Likewise, the same holds true for upper drive motor 38 and upper platen 24.

A control system is configured to move upper platen 24, lower platen 26, and third motion, or plug assist platen 27 via respective servo motors, such as servo motors 38, 40. According to one construction, upper platen 24 and lower platen 26 are each drive platens, and plug assist platen 27 is also a moving platen. The control system includes a controller comprising processing circuitry and memory configured to precisely regulate motion of platens 24, 26 and 27 in desired, timed synchronization such that individual plugs, or male dies 47 are driven upwardly with a greater combination of speed and force than would be capable by merely moving platens 24 and 26 together. In operation, platens 24 and 26 are driven together into a heated web of thermoformable material that is captured between upper platen 24 and lower platen 26 during a thermoforming operation. A seal 65 is provided around each male plug 47, while a vacuum is applied to the bottom of mold plate 44 (top of the thermoformable web) via a vacuum source through vacuum ports 69, and pneumatic form pressure is applied along the top of mold plate 46 (bottom of the thermoformable web) to help form the web. However, this generates considerable loads, which are countered by using platen lock assembly 12. For the case of some mold designs, an entire periphery along top surface of mold plate 46 is encircled by a seal, which generates considerable loads when vacuum and pressure are applied to respective top and bottom surfaces of a thermoformable web, or sheet 21. Third motion platen 27 is subsequently moved upwardly relative to moving platen 26 so as to cause forming of a thermoformed article in a heated plastic web between each individual pair of complementary male plugs 47 and female die cavities 45, while platen lock assembly 12 is locked. As shown in FIG. 1, numerous rows of complementary, interacting male plugs 47 and female die cavities 45 are provided in die plates 46 and 44 affixed to respective platens 26 and 24, respectively. Subsequently, platens 24, 26 and 27 are withdrawn, or retracted apart in order to start the cycle all over again, and third motion platen 27 is lowered relative to lower platen 26. The cyclical process is then repeated.

Preferably, a modern rotary electric servo drive motor, or actuating device, is used for drive motors 15 and 17 (see FIG. 2). Such a drive includes an AC servo motor and an associated servo drive motor controller. For example, one suitable AC motor is sold by Siemens AG, Automation Group, Automation Systems for Machine Tools, Robots and Special-Purpose Machines, P.O. Box 31 AD, D-91050, Erlangen, Federal Republic of Germany. Additionally, one suitable servo drive motor controller is sold by Siemens as an analog feed drive system including the SIMO DRIVE 611-A Transistor PWM Inverters and Motors for AC FV Drives. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive. Furthermore, one suitable servo drive motor used for servo drive motor 58 is also a Siemens AC servo motor, model number 1FT5132-OSC71-1-ZH27, also available from Siemens AG. Automation Group, Automation Systems for Machine Tools, Robots and Special-Purpose Machines, P.O. Box 31 AD, D-91050, Erlangen, Federal Republic of Germany.

As shown in FIG. 2, plug assist drive assembly 12 reciprocates third motion platen 36 up and down relative to lower platen 34. Platen 36 is guided for axial reciprocation by a rectangular array of bronze bushings 28-31, each contained within a housing, that are slidably received over respective cylindrical die posts 24-27 mounted rigidly to lower platen 34. Optionally, plug assist drive assembly can be mounted to upper platen 32, with the third motion platen being driven in a downward direction while the upper platen is being driven downwardly. Further optionally, a third motion platen can be mounted to a stationary platen, when an opposing platen is moved to and fro. Further optionally, a third motion platen can be mounted for horizontal movement relative to a moving platen from a pair of opposed moving platens that move together and apart along a horizontal direction. Finally, a third motion platen can be affixed to any one of a pair of platens that move together and apart along a contact plane in any angular orientation.

Figure 4:
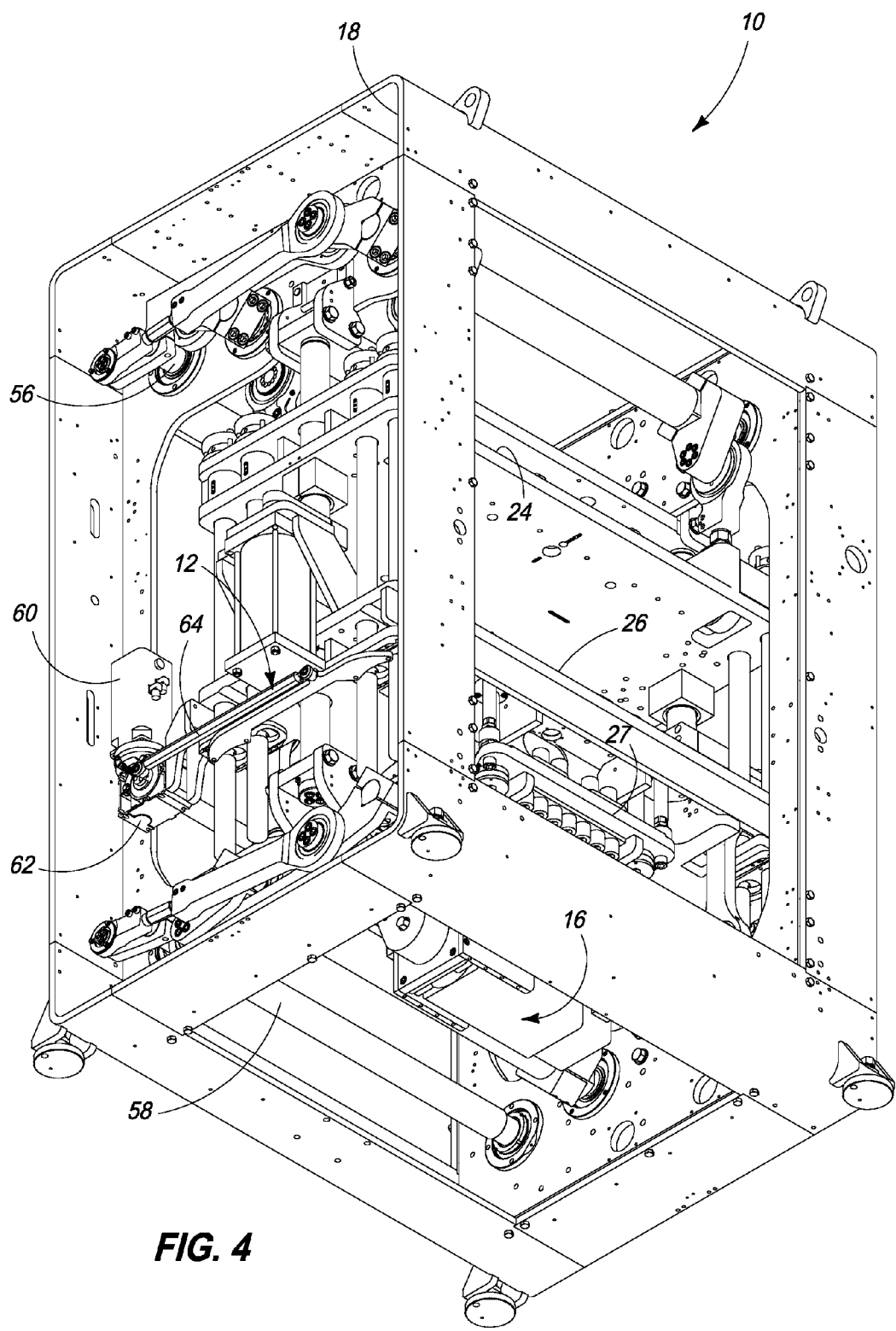
FIG. 4 is a perspective view from below of the thermoforming machine of FIGS. 1-3 taken from a kinematic drive linkage side.

As shown in FIGS. 3-4, a servo motor 60 drives a cross shaft 61 via a gearbox 62, using a connecting rod 64 that is eccentrically mounted onto each end of cross shaft 61 to drive a respective drive bar 74 and 75 (see FIG. 5) to-and-fro so as to lock and unlock platen lock assembly 12. Accordingly, load shafts 48-55 of FIG. 3 lock together platens 24 and 26 while vacuum and pressure are respectively applied to top and bottom surfaces of a thermoformable web presented between respective mold plates (see FIG. 1). A pneumatic cylinder 43 is pressurized so as to counterbalance gravitational pull on lower platen 26.

Figure 5:
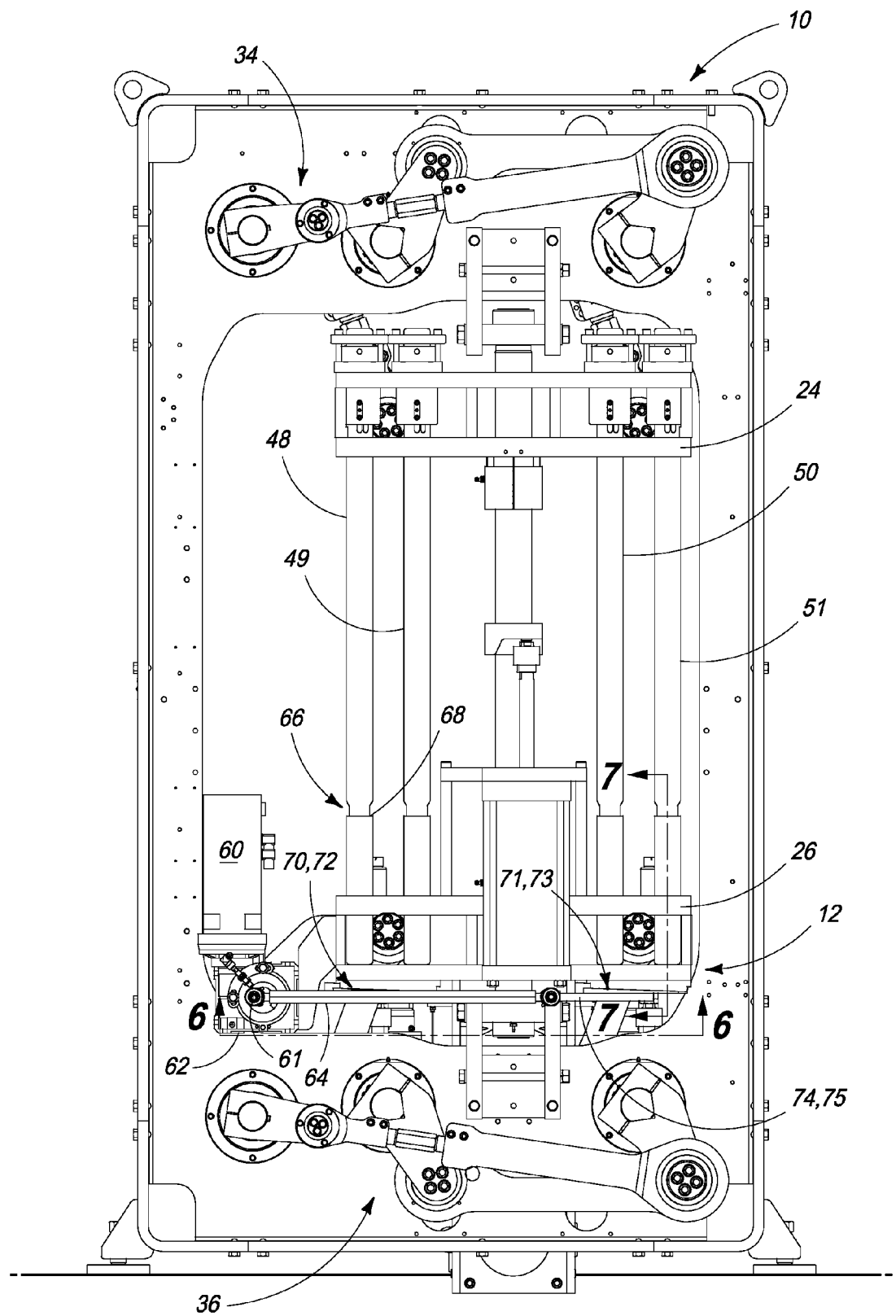
FIG. 5 is an elevational side view of the thermoforming machine of FIG. 3 showing the upper and lower platens unlocked and in a fully open, or separated position (but with the forming dies plates omitted).

FIG. 5 illustrates platens 24 and 26 is a fully open state via positioning of kinematic linkages 34 and 36, with lock plate assemblies 70-73 of platen lock assembly 12 placed in an unlocked position via servo motor 60, shaft 61, gearbox 62, rods 64 and drive bars 74 and 75. FIG. 6 further illustrates the open, or unlocked position between load shafts 48-51 relative to lock plate assemblies 70 and 71. Likewise, FIG. 7 further illustrates the position of load shaft 51 relative to lock plate assembly 71 when unlocked with the platens opened (or moved apart), and showing reduced diameter portion, or lock ledge 66 having a horizontal engagement surface, or circumferential shelf 68. Furthermore, FIG. 8 shows load shafts 50 and 51 in the unlocked and open position relative to lock plate assembly 71, with lock ledges 66 raised relative to lock plate assembly 71.

Figure 9:
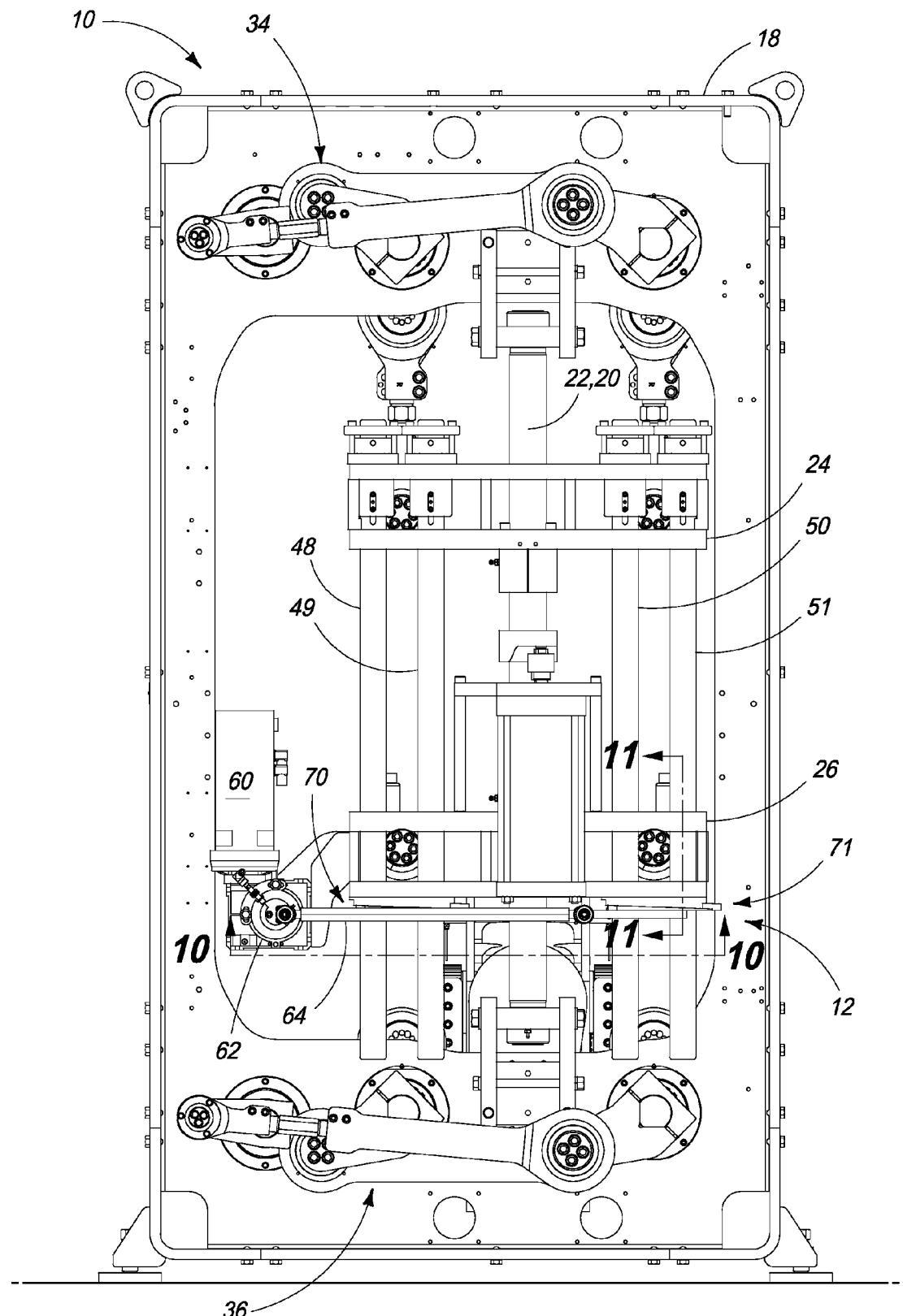
FIG. 9 is a vertical side view of the thermoforming machine of FIG. 3, but later in time and showing the upper platen lowered and the lower platen raised to positions that correspond with a position where die plates (not shown) would be fully engaged during a thermoforming operation.
Figure 13:
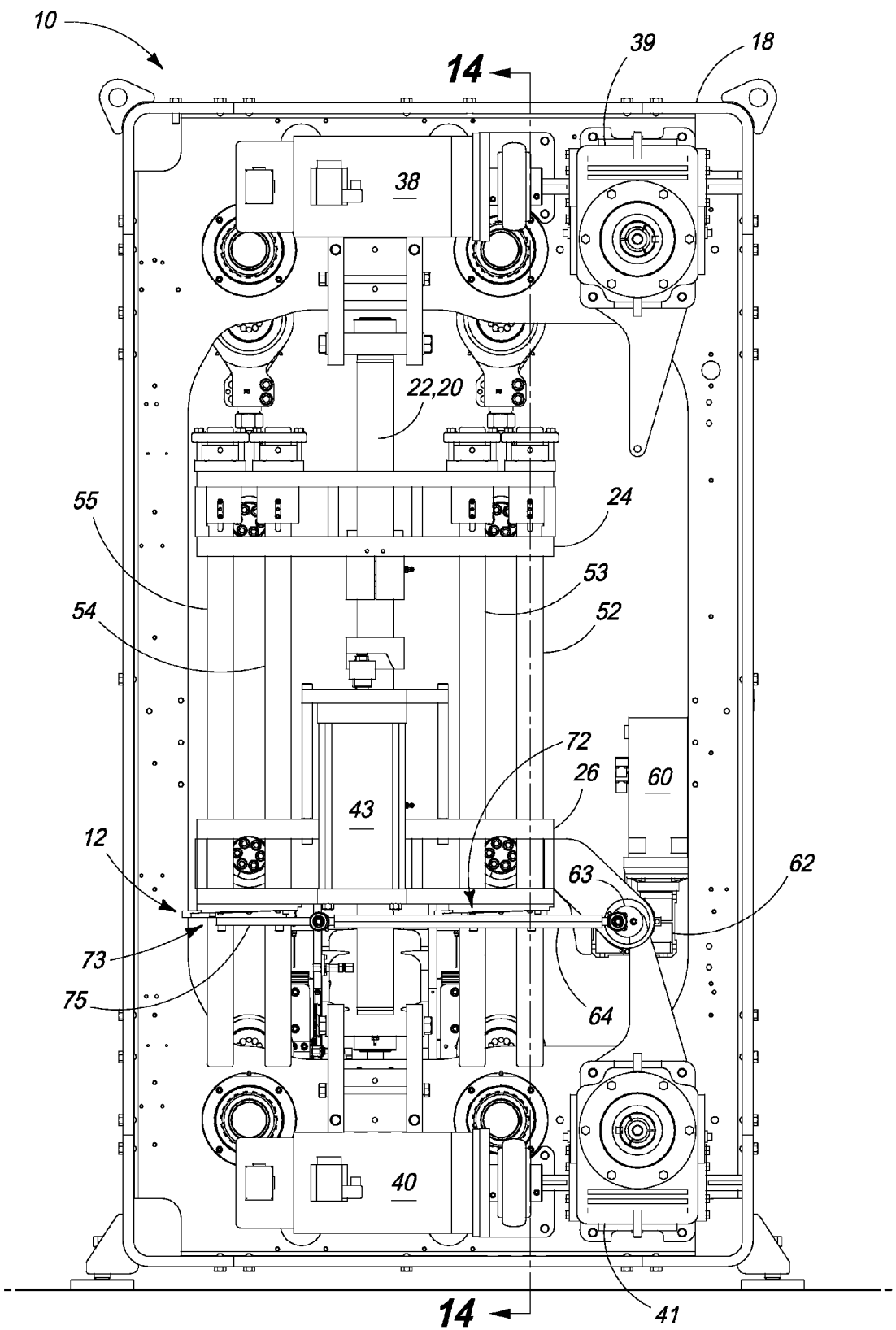
FIG. 13 is a vertical side view of the thermoforming machine taken on an opposite side of the view in FIG. 3 and corresponding with the same time and showing the upper platen lowered and the lower platen raised to positions that correspond with a position where die plates (not shown) would be fully engaged during a thermoforming operation.
Figure 15:
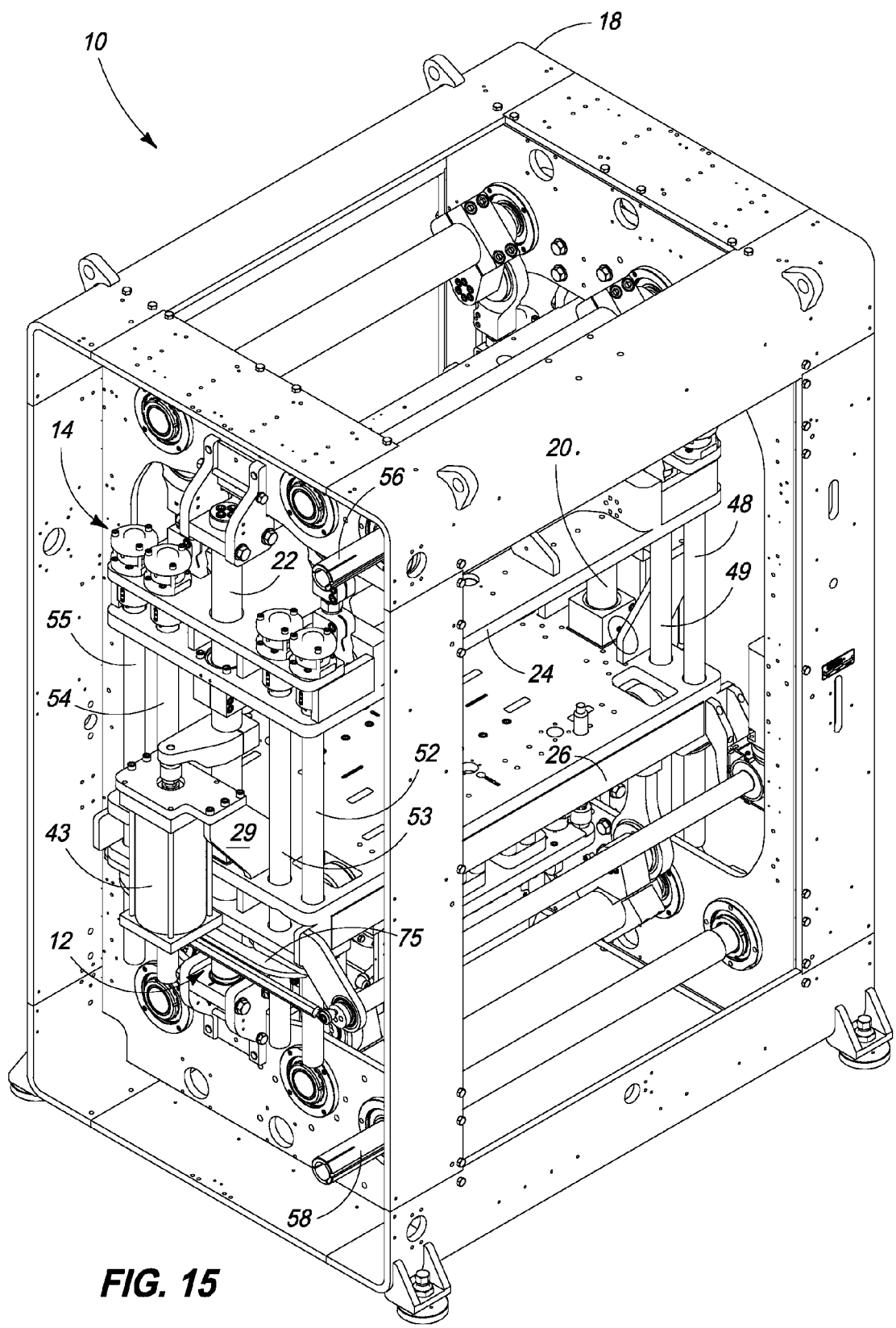
FIG. 15 is a perspective view from above of the thermoforming machine of FIG. 1 with upper and lower servo drive motors, gearboxes, and die plates removed.

FIGS. 9 and 15 illustrate thermoforming machine 10 on opposite sides, with FIG. 13 showing the configuration of servo motors 38 and 40 with respective gearboxes 39 and 41. An eccentric mount on each end of shaft 61 is positioned to place drive bars 74 and 75 in forward positions, locking each lock plate assembly 70-73 onto each respective load shaft 48-55. In such locked configuration, load shafts 48-55 counter forming pressures imparted when applying vacuum and pressure to top and bottom surfaces of a thermoforming web during an article forming operation.

FIG. 10 depicts lock plate assemblies 70 and 71 in a locked position on load shafts 48-49 and 50-51, respectively. FIG. 11 further illustrates load shaft 51 secured by lock plate assembly 71 along lock ledge 66. Finally, FIG. 12 illustrates load shafts 50 and 51 locked by lock plate assembly 71 while platens 24 and 26 are held in a closed position corresponding with respective mold plates (not shown) being urged together in sealed relationship.

Figure 14:
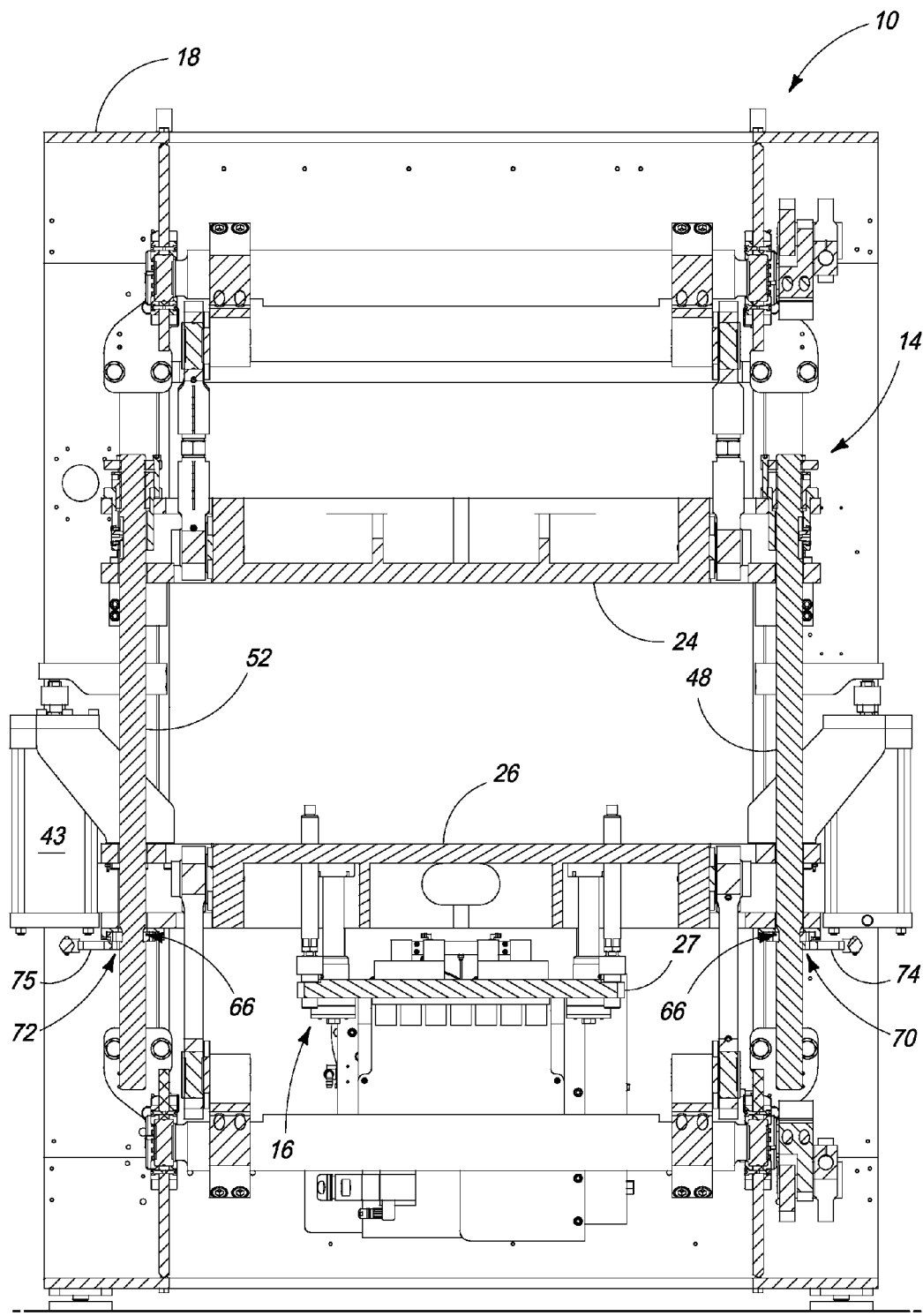
FIG. 14 is a vertical sectional view taken along line 14-14 of FIG. 13.

FIGS. 13 and 14 further illustrate platen lock assembly 12 of thermoforming machine 10 in a locked, or closed position. FIG. 14 depicts third motion plug assist drive assembly 16 in a retracted position, corresponding with male plugs retracted before they are extended into a web during a forming operation.

Figure 16:
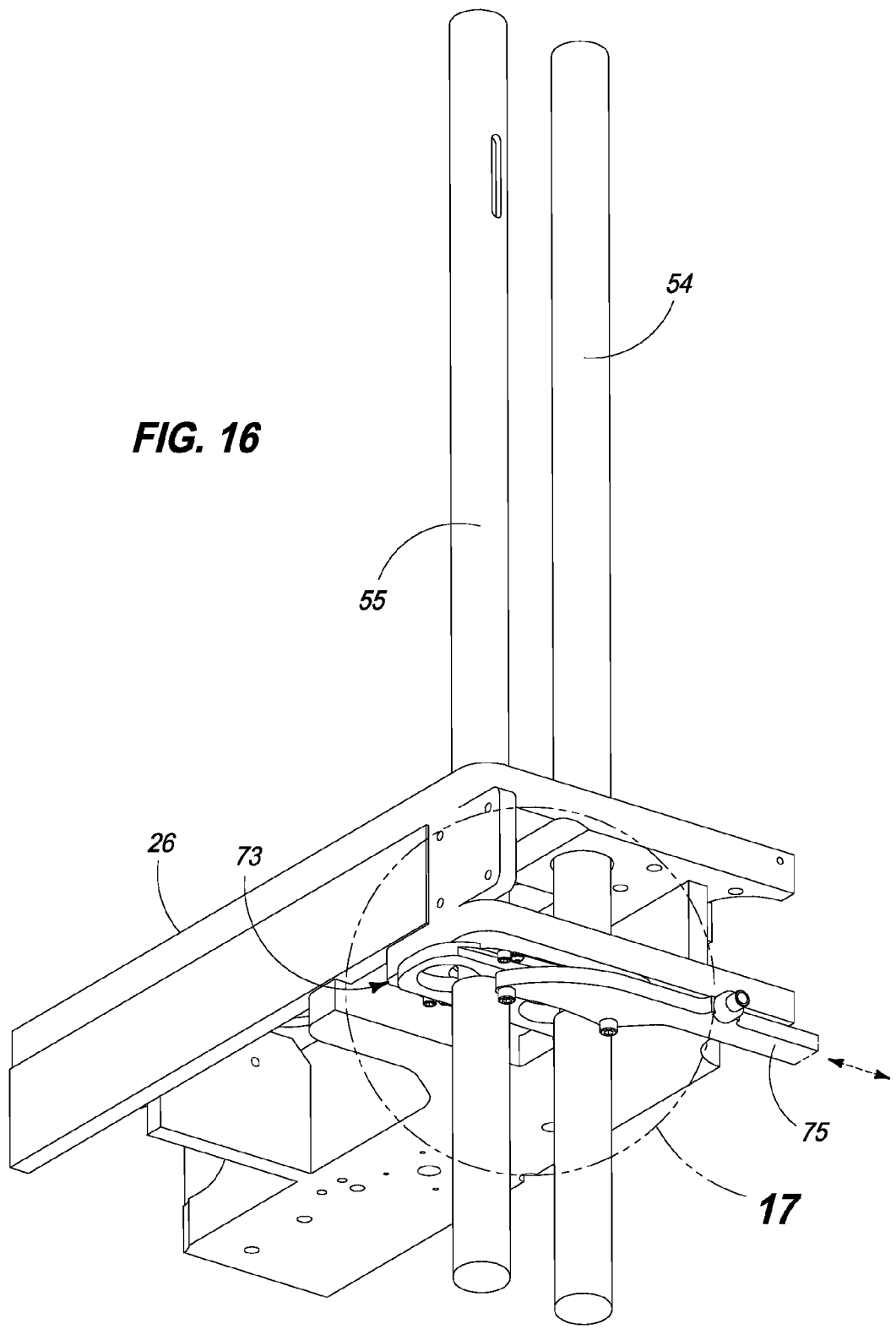
FIG. 16 is a fragmentary component perspective view of one corner of lower platen 26 with a respective pair of load shafts and lock plate assembly depicting the load shafts locked with the lock plate assembly corresponding with a closed platen position.
Figure 17:
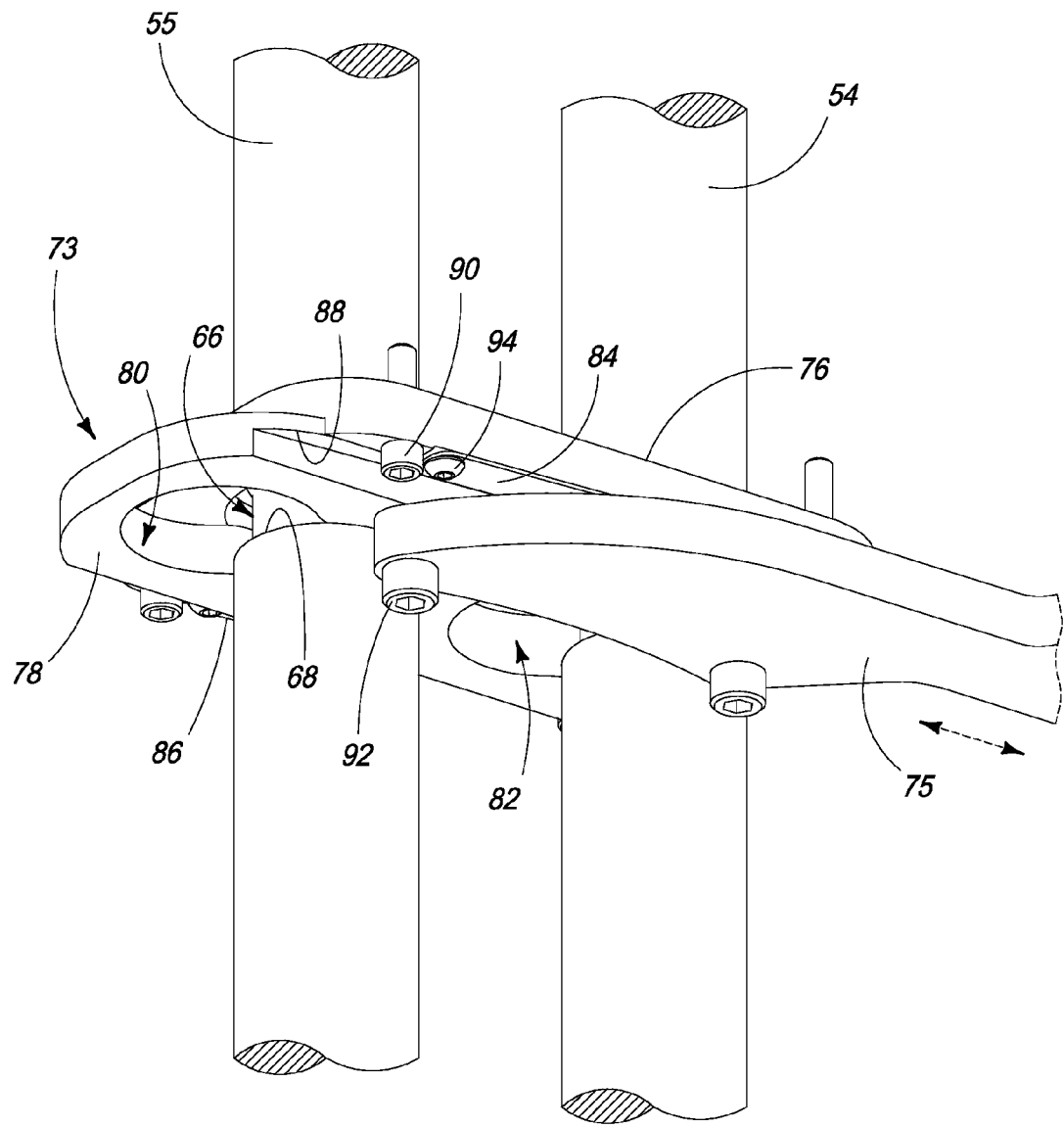
FIG. 17 is an enlarge perspective view of the encircled region 17 of FIG. 16 showing the lock plate assembly in a locked position about the pair of load shafts.

FIG. 16 depicts in component view exemplary load shafts 54 and 55 in a locked position relative to lock plate assembly 73. FIG. 17 further illustrates the configuration of lock plate assembly 73 is a closed, or locked position relative to lock ledges 66 and circumferential shelves 68 on load shafts 54 and 55. A pair of apertures, or key slots 80 and 82 each have an elongate, narrow portion and an enlarged clearance portion. The narrowed portion locks onto ledges 66.

Figure 18:
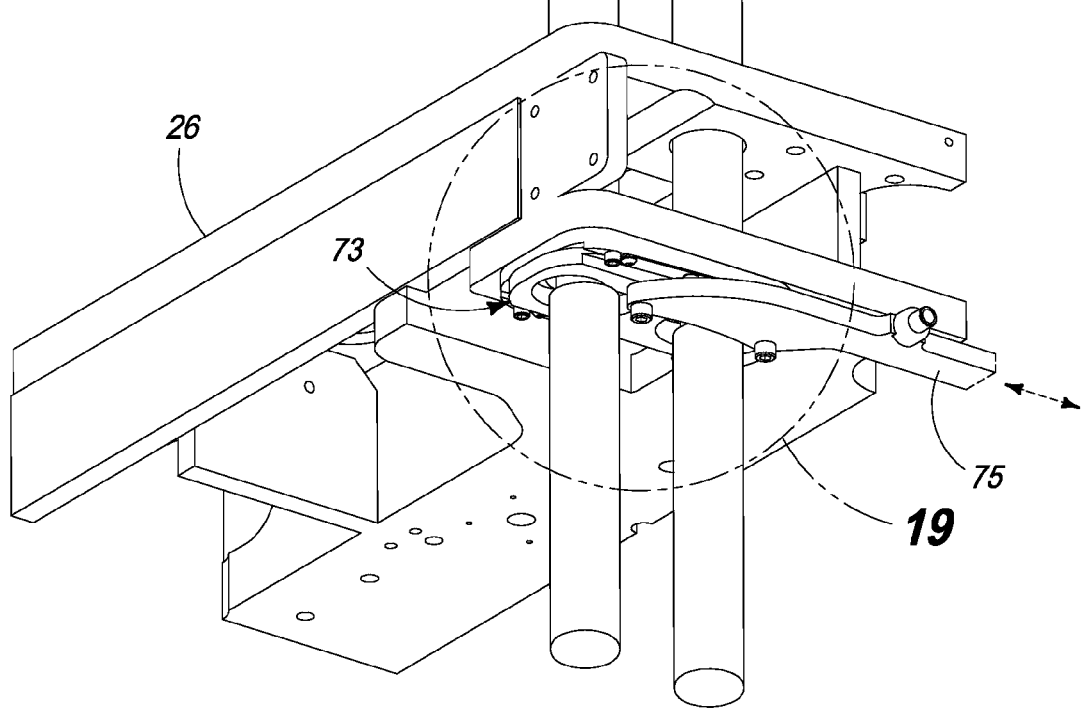
FIG. 18 is a fragmentary component perspective view of one corner of lower platen 26 with a respective pair of load shafts and lock plate assembly corresponding with that shown in FIG. 16, depicting the load shafts with the lock plate assembly moving from a fully locked position towards an open position.
Figure 27:
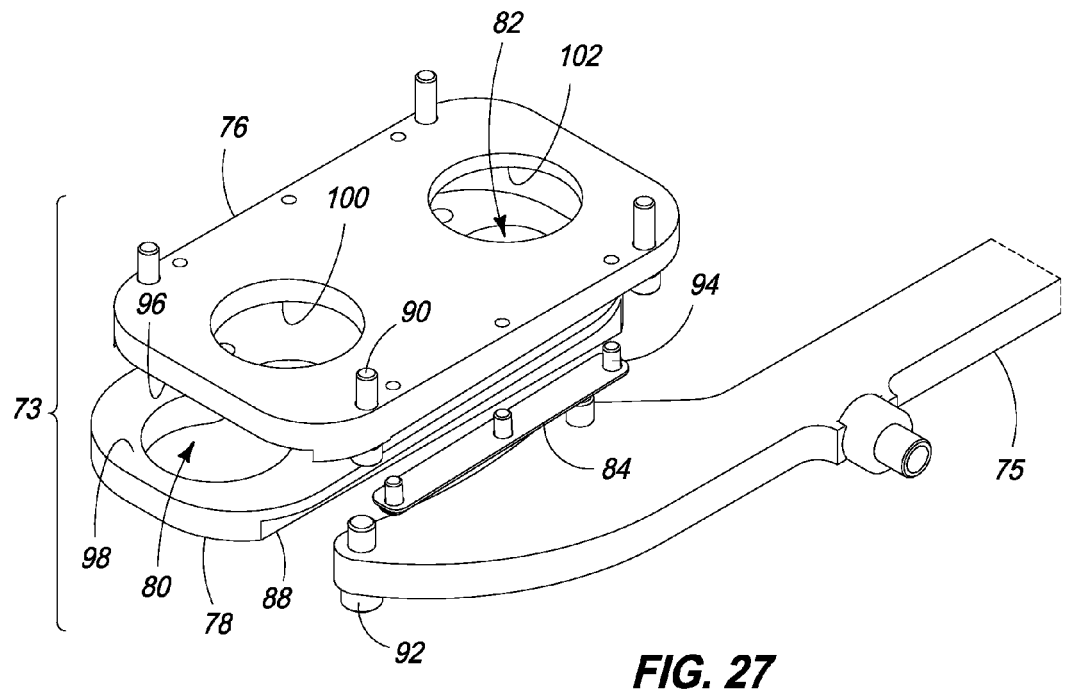
FIG. 27 is an exploded component perspective view from above of one lock plate assembly.
Figure 28:
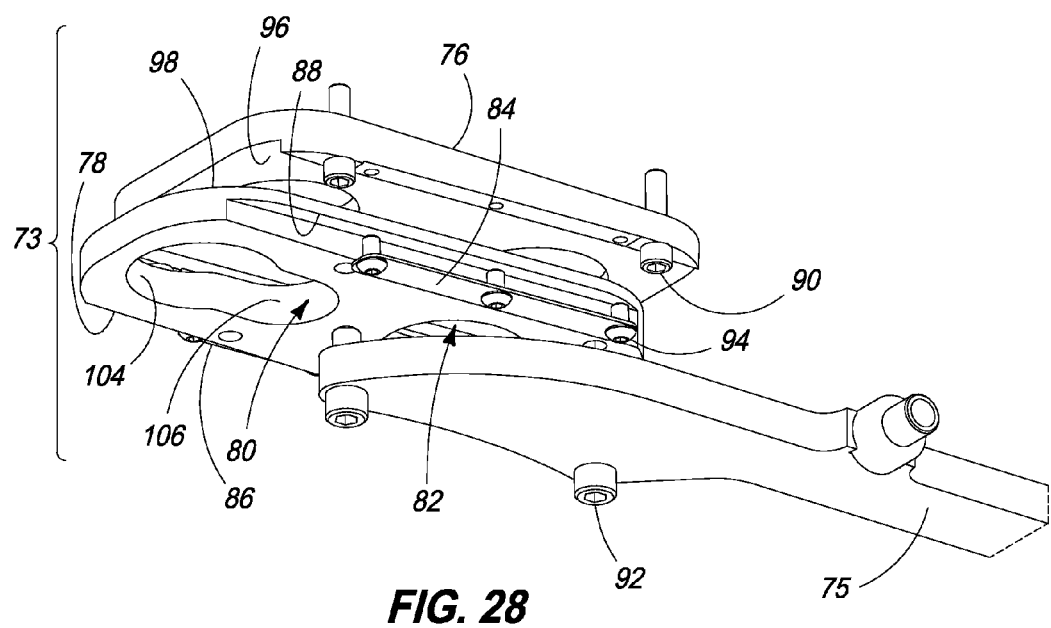
FIG. 28 is an exploded component perspective view from below of the lock plate assembly of FIG. 27.

As shown in FIGS. 16 and 27-28, lock plate assembly 73 comprises a stationary beveled clearance plate 76 and a movable beveled key plate 78. Plates 76 and 78 each have top and bottom surfaces that are beveled at 2 degrees such that motion of plate 78 relative to plate 76 increases and decreases total thickness of lock plate assembly 73. When locked, the total thickness increases. The ability to adjust thickness ensures that proper sealing occurs between the top and bottom mold plates when pressed together while applying vacuum and pressure. Threaded fasteners 90 secure plate 76 to platen 26 (see FIG. 18), while threaded fasteners 94 secure retainer plates 84 and 86 onto plate 76 (see FIG. 17). Finally, threaded fasteners 92 secure drive bar 75 onto plate 78. A pair of parallel elongate grooves 88 provide a sliding surface along plates 84 and 86, facilitating sliding to-and-fro of plate 78 relative to stationary plate 76 when locking and unlocking lock plate assembly 73 relative to load shafts 54 and 55.

Figure 19:
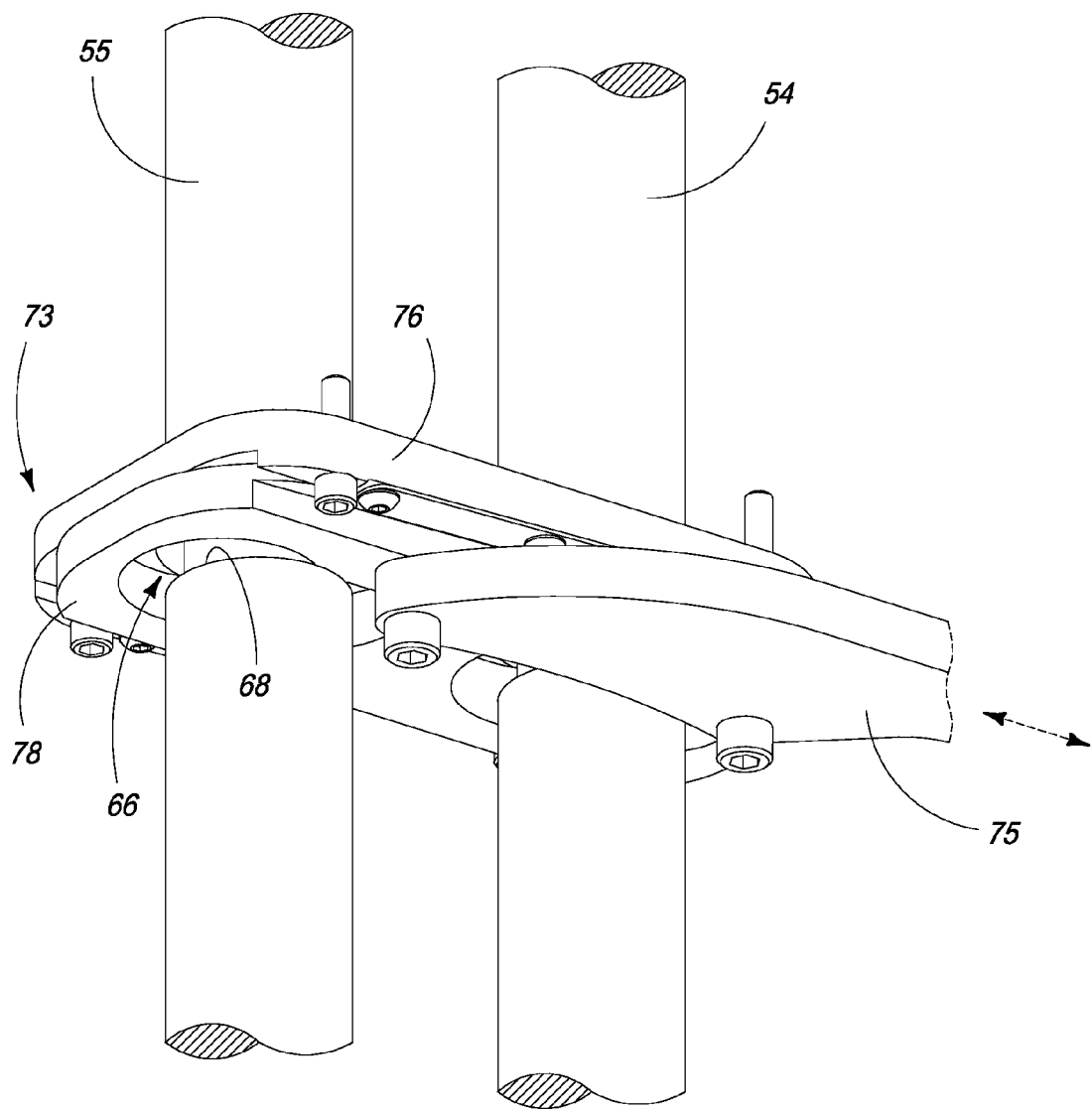
FIG. 19 is an enlarged perspective view of the encircled region 19 of FIG. 18 further showing the lock plate assembly.

FIG. 19 illustrates lock plate assembly 73 being moved towards an open position, decreasing thickness of assembly 73 while plate 78 slides relative to stationary plate 76.

FIG. 20 further illustrates lock ledges 66 and circumferential shelves 68 on load shafts 54 and 55, as viewed from above which respective platens are pulled apart and lock plate assembly 73 is open.

Figure 21:
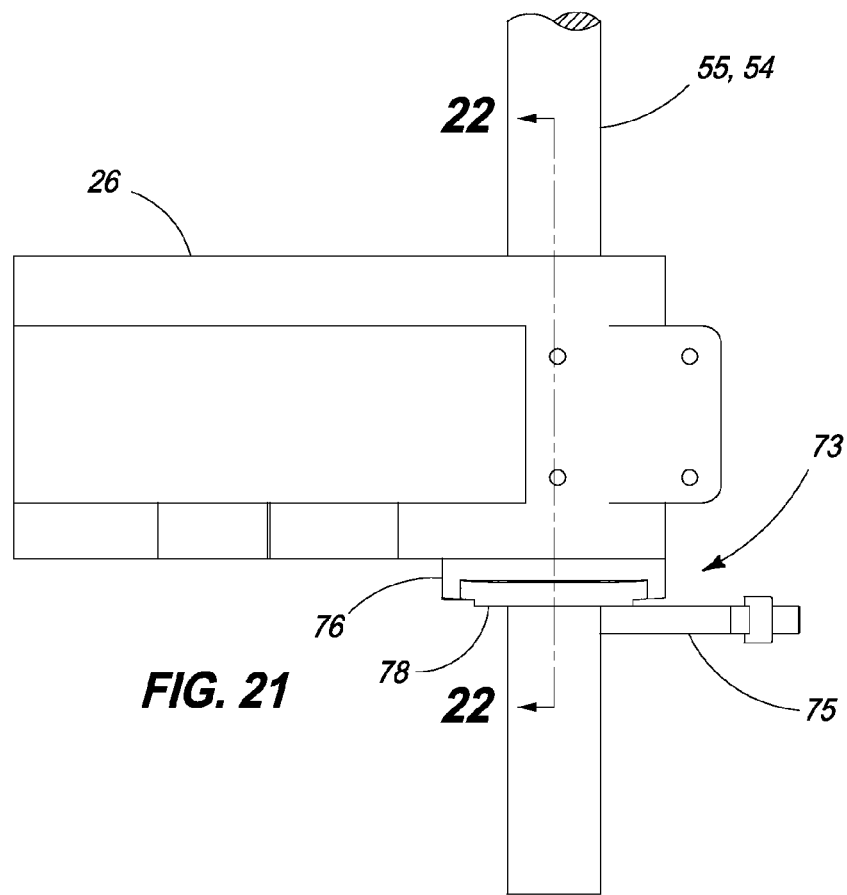
FIG. 21 is a vertical side view of a portion of the lower platen, load shafts, and lock plate assembly depicted in FIG. 18 in a fully locked position.
Figure 22:
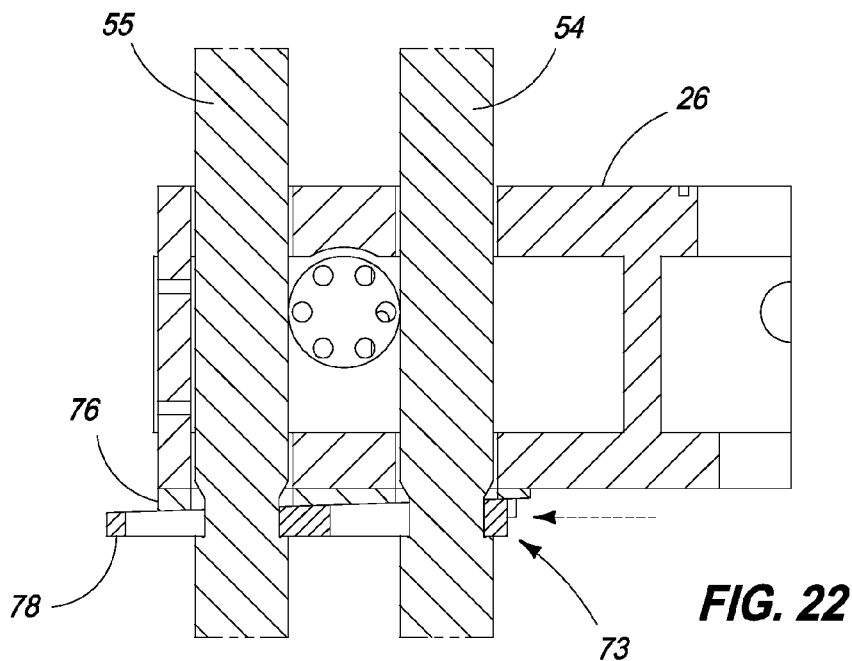
FIG. 22 is a vertical sectional view taken along line 22-22 of FIG. 21 showing the fully locked position.

FIGS. 21 and 22 illustrate load shafts 54 and 55 when locked onto platen 26 via lock plate assembly 73. Plate 78 is shown in a translated position that thickens lock plate assembly 73 by sliding the respective beveled surfaces between plates 76 and 78.

Figure 23:
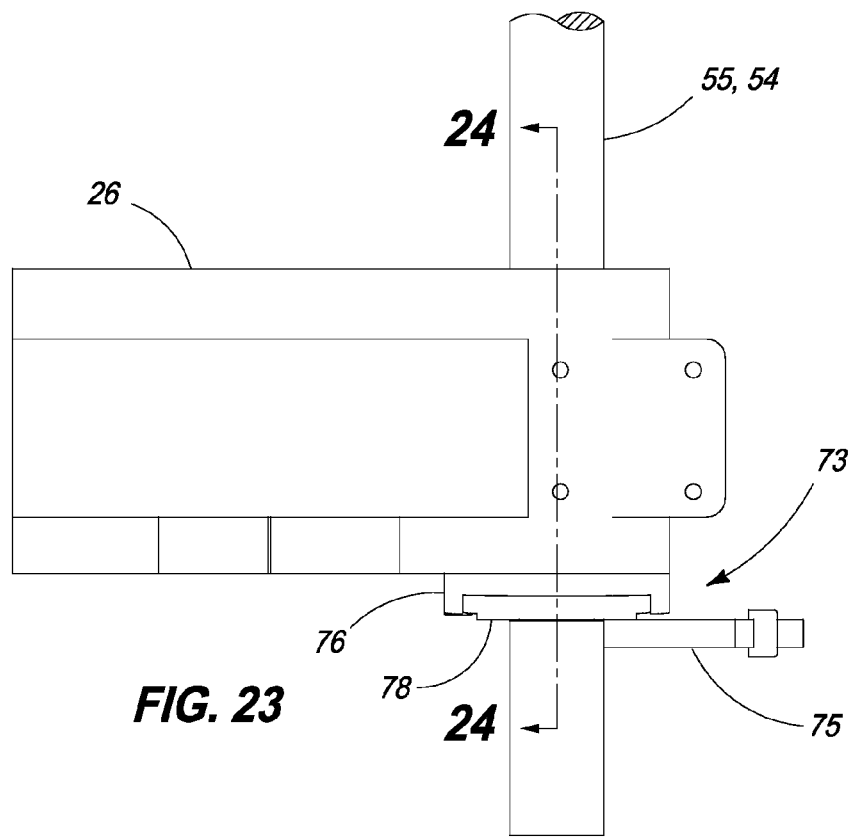
FIG. 23 is a vertical side view of a portion of the lower platen, load shafts, and lock plate assembly depicted in FIG. 21 in a partially locked position.
Figure 24:
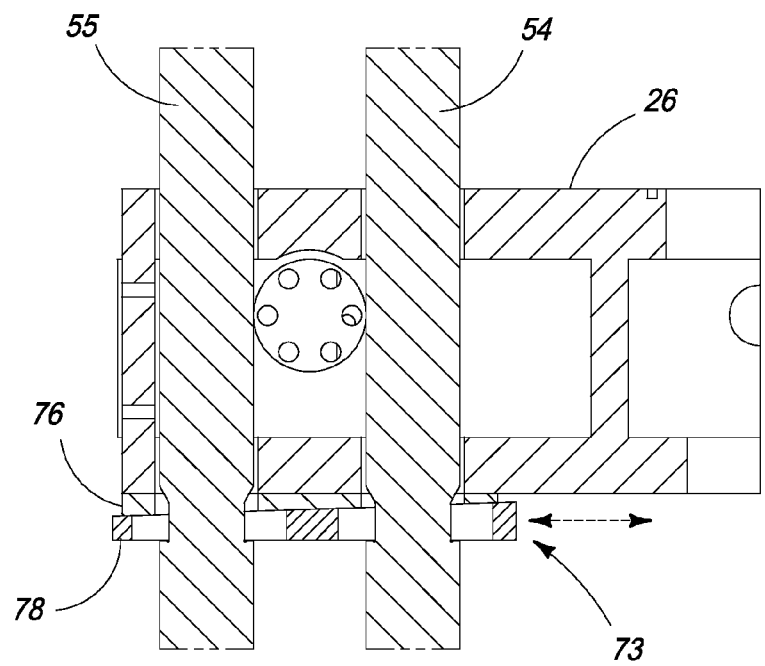
FIG. 24 is a vertical sectional view taken along line 24-24 of FIG. 23 showing the partially locked position.

In contrast, FIGS. 23 and 24 illustrate load lock plate assembly 73 in an open configuration corresponding with plate 78 being slide relative to plate 76 so as to reduce thickness of lock plate assembly 73 and open assembly 73 so that shafts 54 and 55 can subsequently be raised.

Figure 25:
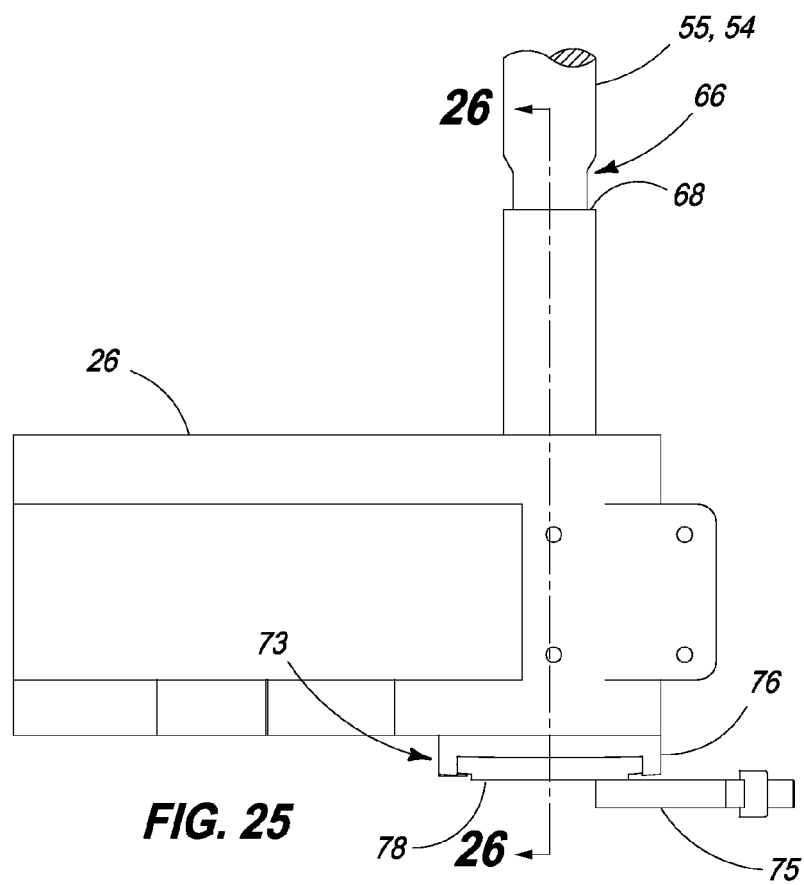
FIG. 25 is a vertical side view of a portion of the lower platen, load shafts, and lock plate assembly depicted in FIG. 21 in an unlocked position.
Figure 26:
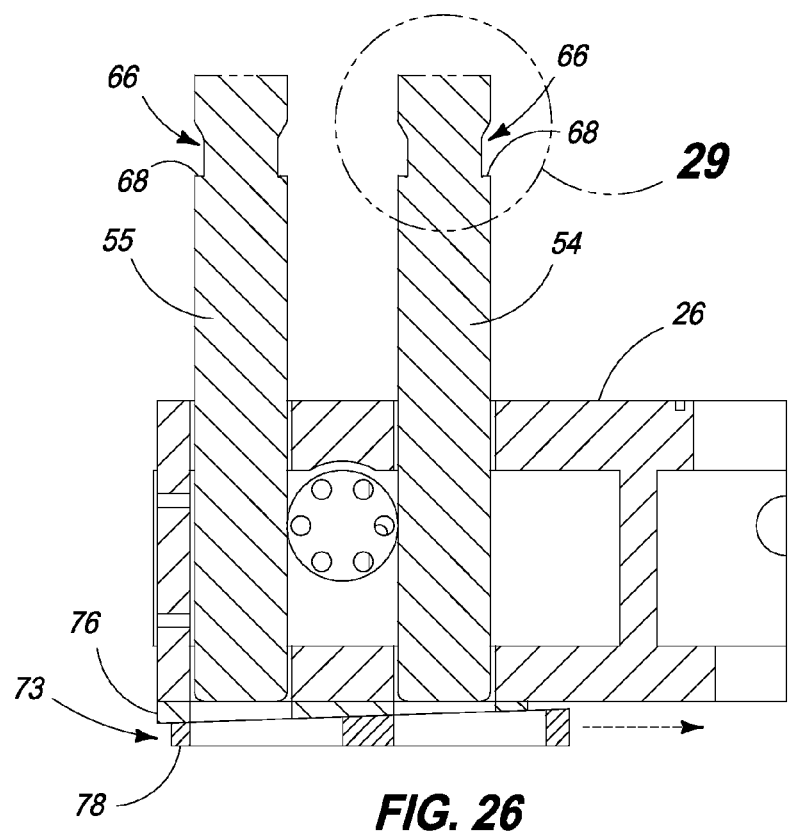
FIG. 26 is a vertical sectional view taken along line 24-24 of FIG. 23 showing the unlocked position corresponding with the upper platen raised and the lower platen lowered, as shown in FIG. 5.

FIGS. 25 and 26 show load shafts 48 raised while lock plate assembly 73 is held open.

Figure 29:
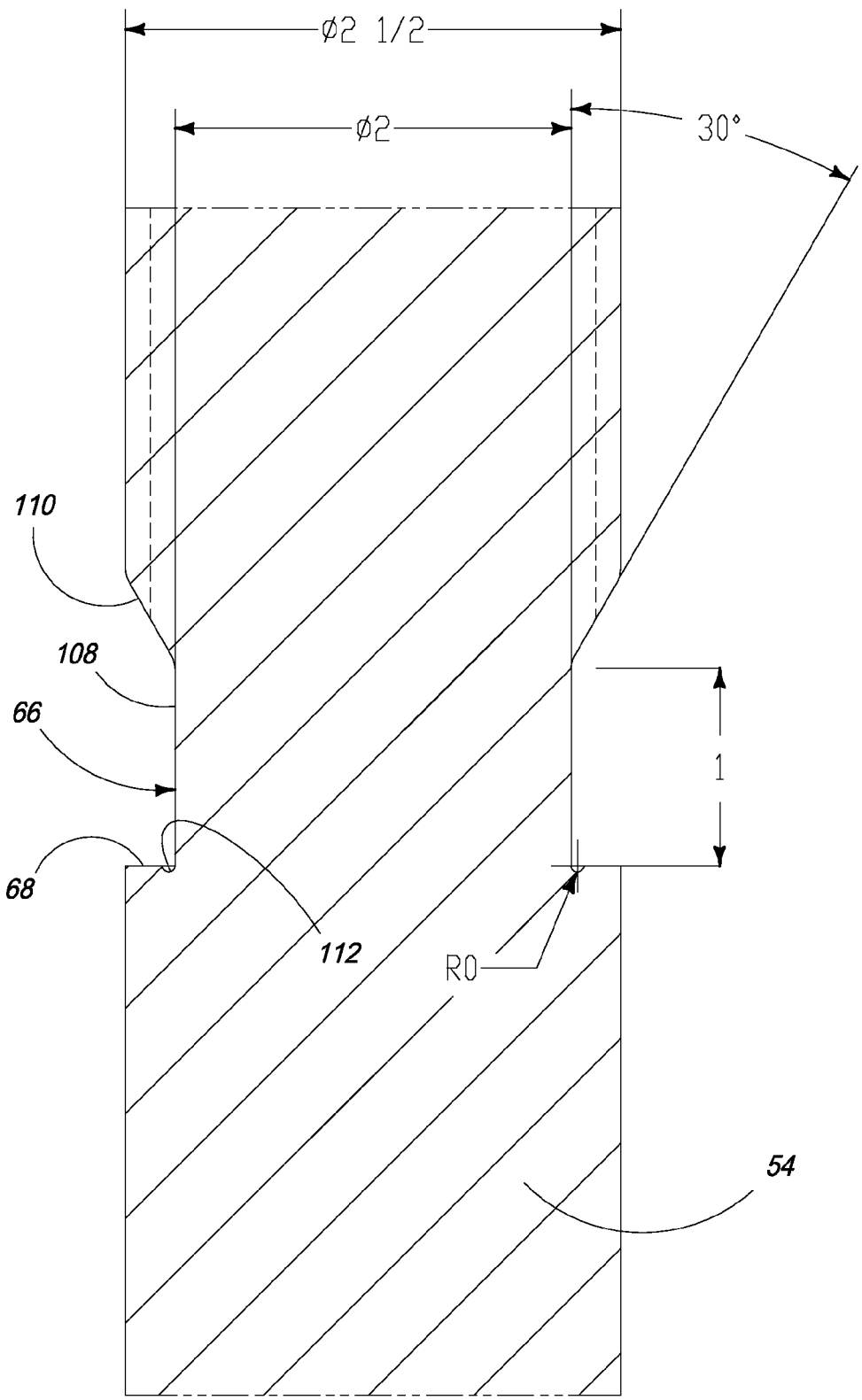
FIG. 29 is an enlarged centerline sectional view taken from encircled region 29 of FIG. 26.

FIG. 29 illustrates in centerline sectional view an exemplary load shaft 54. According to one construction, load shafts 25 and 26 are made of 4340 steel heat treated to 45 RC. Furthermore, slider plates 76 and 78 (see FIG. 27) are made of 8620 case hardened steel at a 0.03 minimum depth to 58 RC.

Figure 30:
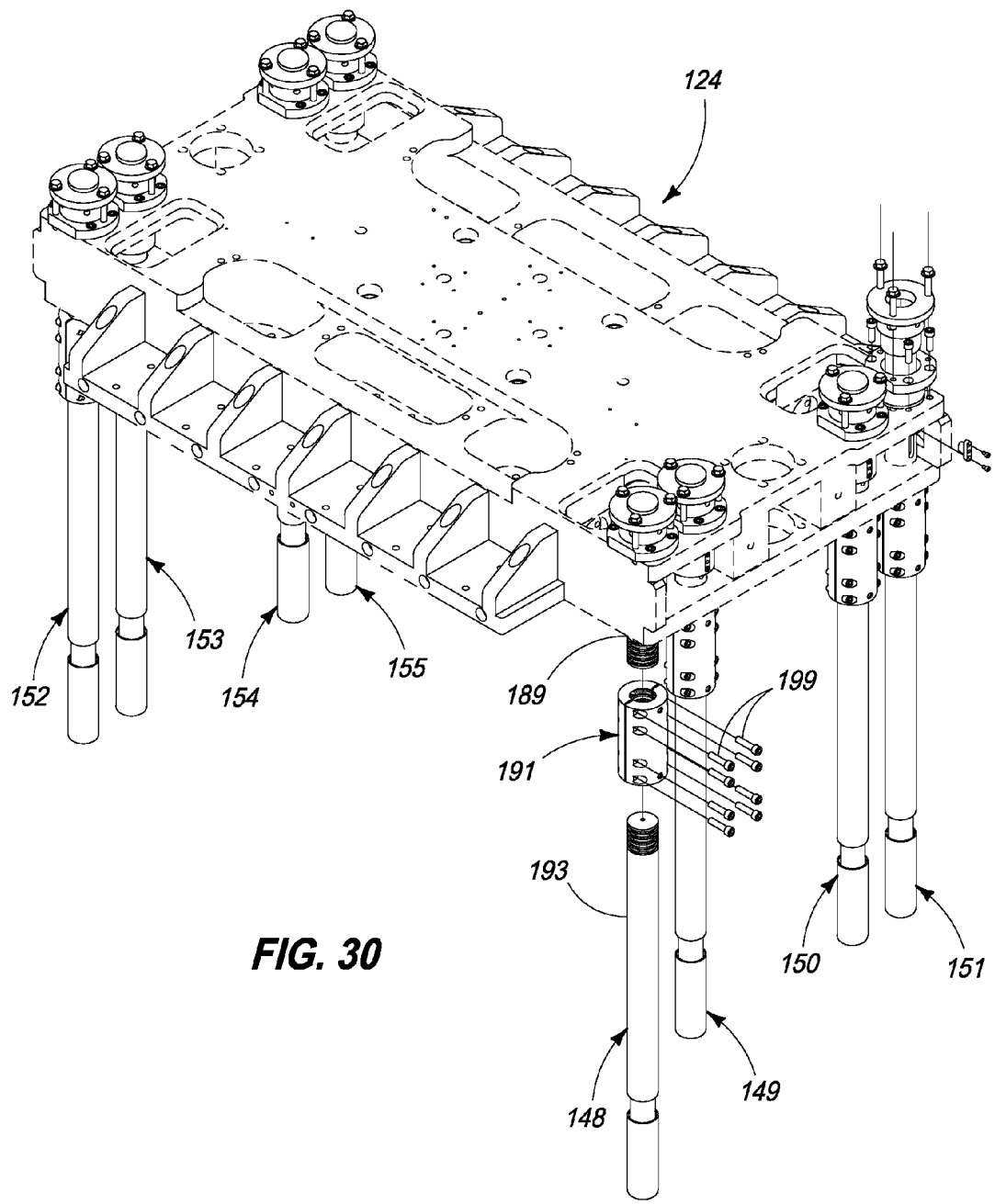
FIG. 30 is a perspective view from above of an alternate embodiment upper platen and retrofit load shafts usable on a thermoforming machine similar to that depicted in FIGS. 1-29.

FIG. 30 is a perspective view from above of an alternate embodiment upper platen 130 and retrofit load shafts 148-155 usable on a thermoforming machine 124 similar to that depicted in FIGS. 1-29. Each shaft, such as shaft 148, is configured in multiple pieces 189 and 193 with are joined together via a clamp collar assembly using threaded fasteners 199.

Figure 31:
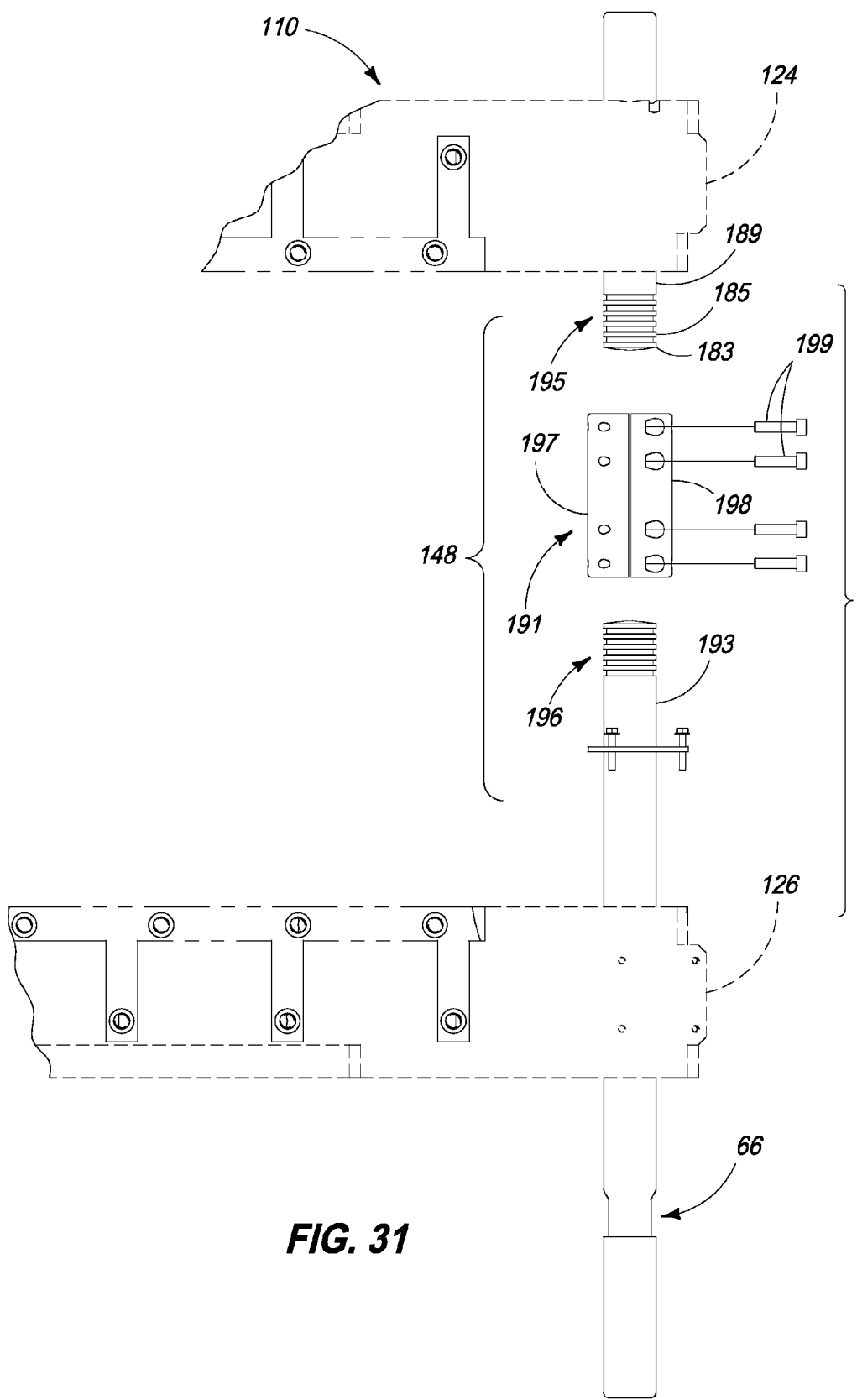
FIG. 31 is an exploded and partial phantom view showing one retrofit load shaft of FIG. 30.

FIG. 31 is an exploded and partial phantom view showing one retrofit load shaft 148 of FIG. 30. More particularly, upper portion 189 and lower portion 193 of shaft 148 each have an array of annular ridges 183 and recesses 185 that interlock in assembly with complementary recesses 181 and ridges 179 (see FIG. 36) within collar 191. Splice collar 191 comprises a pair of semi-cylindrical shells 197 and 198 that are joined together over fastening ends 195 and 196 by receiving threaded fasteners 199 through bores in shell 198 into complementary threaded bores in shell 197. Shaft 148 extends between upper platen 124 and lower platen 126 and is operative to lock together such platens in a manner previously described with respect to the embodiment depicted in FIGS. 1-29.

Figure 32:
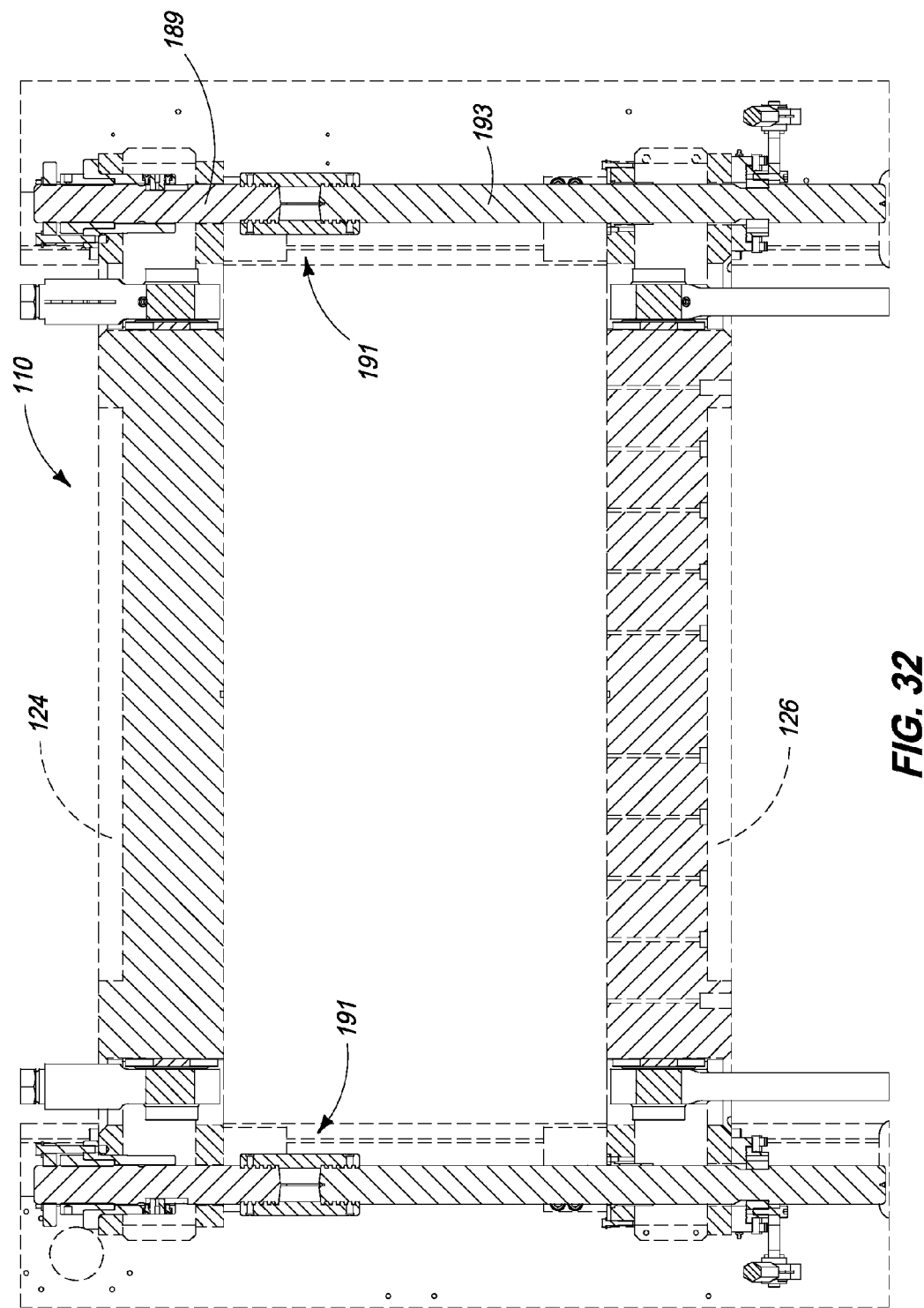
FIG. 32 is a partial vertical sectional view of a thermoforming machine with the platen and retrofit load shafts of FIGS. 30-31 taken through a centerline of the load shafts.

FIG. 32 is a partial vertical sectional view of a thermoforming machine 110 with the platen and retrofit load shafts of FIGS. 30-31 taken through a centerline of the load shafts. Splicing collars 191 are shown joining together shaft sections 189 and 193, in assembly.

Figure 33:
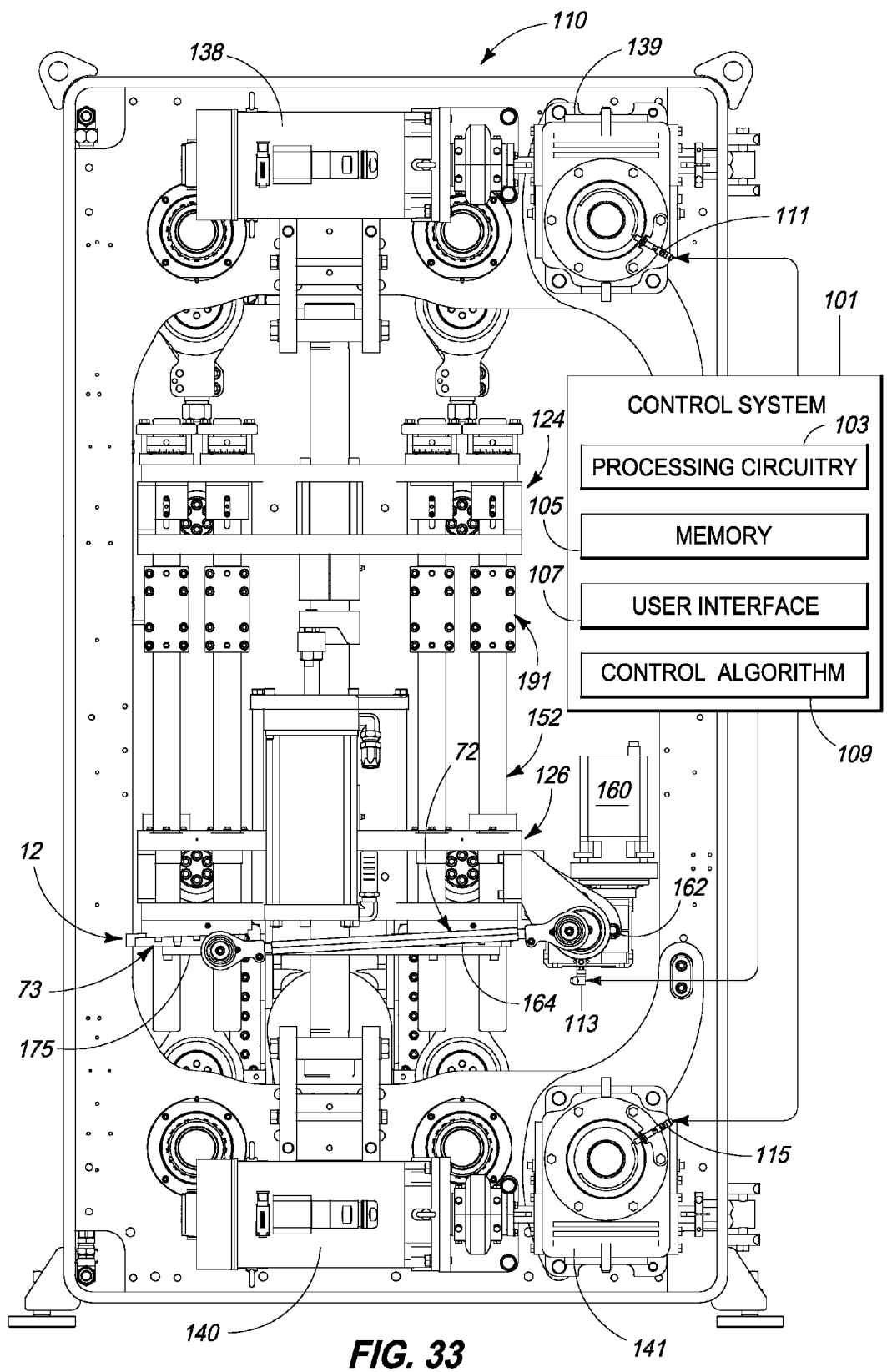
FIG. 33 is a side elevational view of another alternative embodiment thermoforming machine similar to that depicted in FIGS. 1-29, but incorporating the upper platen and retrofit load shafts of FIGS. 30-32, and a control system.

FIG. 33 is a side elevational view of another alternative embodiment thermoforming machine similar to that depicted in FIGS. 1-29, but incorporating the upper platen and retrofit load shafts of FIGS. 30-32, and a control system. A control system 101 having processing circuitry 103, memory 105, a user interface 107, and a control algorithm 109 control servo motors 138, 140 and 160, and receive signals from position sensors 111, 113 and 115 to verify position of respective gearboxes 139, 141 and 162, respectively.

Figure 34:
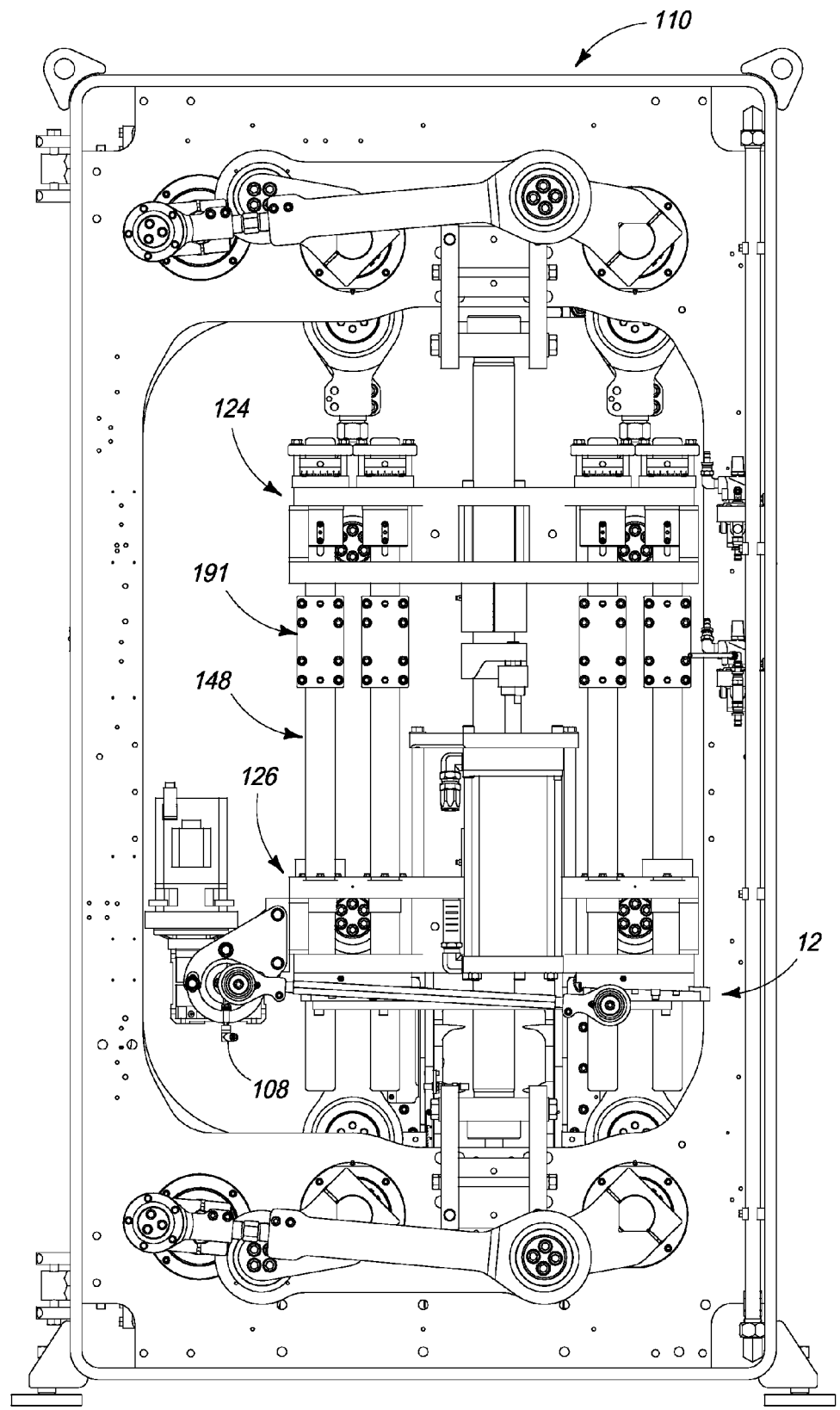
FIG. 34 is a vertical side view of thermoforming machine of FIG. 33, but taken from an opposite side.

FIG. 34 is a vertical side view of thermoforming machine of FIG. 33, but taken from an opposite side.

Figure 35:
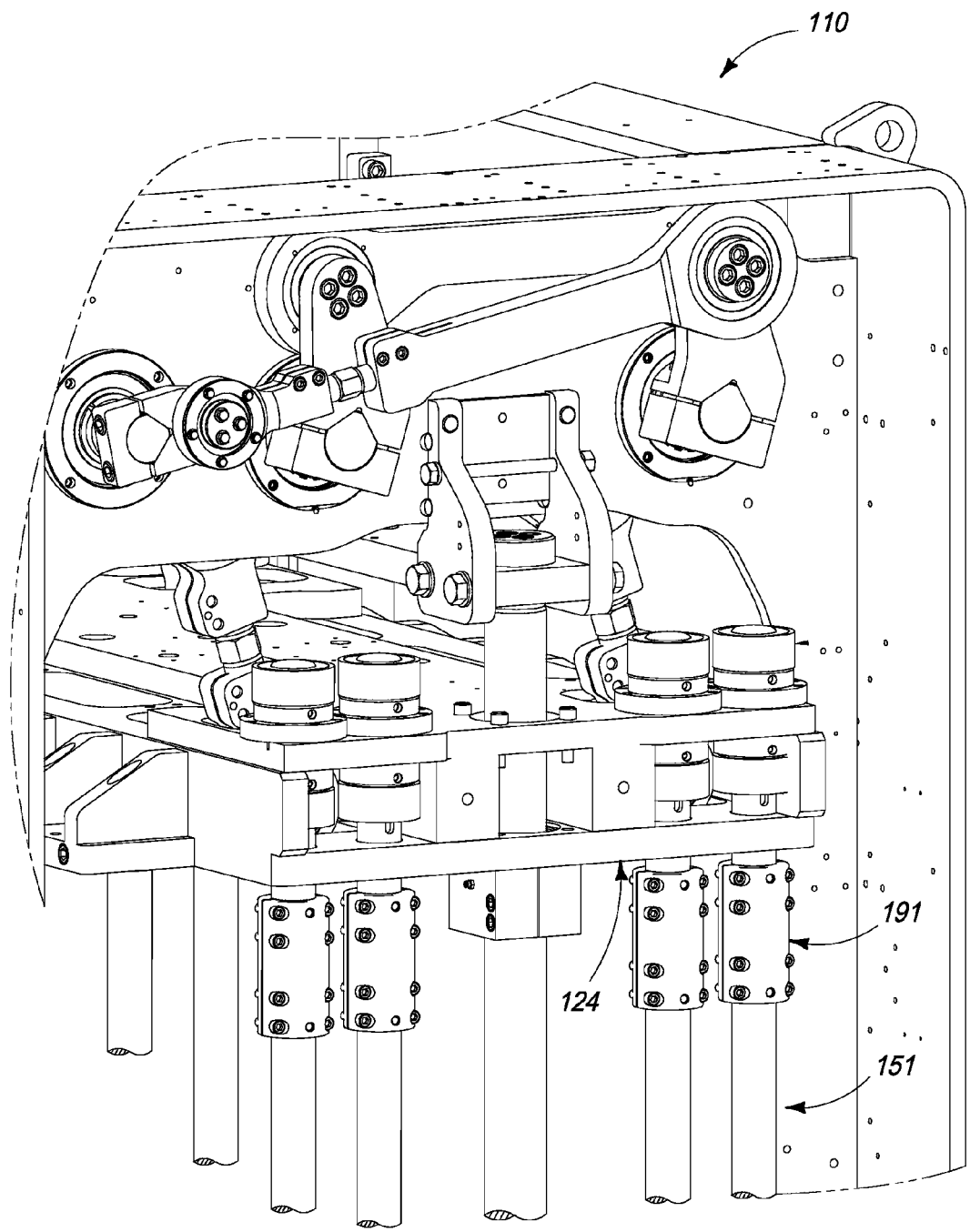
FIG. 35 is an enlarged partial perspective view of the upper platen and retrofit load shafts on the thermoforming machine of FIGS. 30-34.

FIG. 35 is an enlarged partial perspective view of the upper platen and retrofit load shafts on the thermoforming machine of FIGS. 30-34. Splice collars 191 facilitate assembly of load shafts 151 on a thermoforming machine with having to totally disassemble the machine. Hence, a thermoforming machine can be retrofit with load shafts 151 by using splice collars 191.

Figure 36:
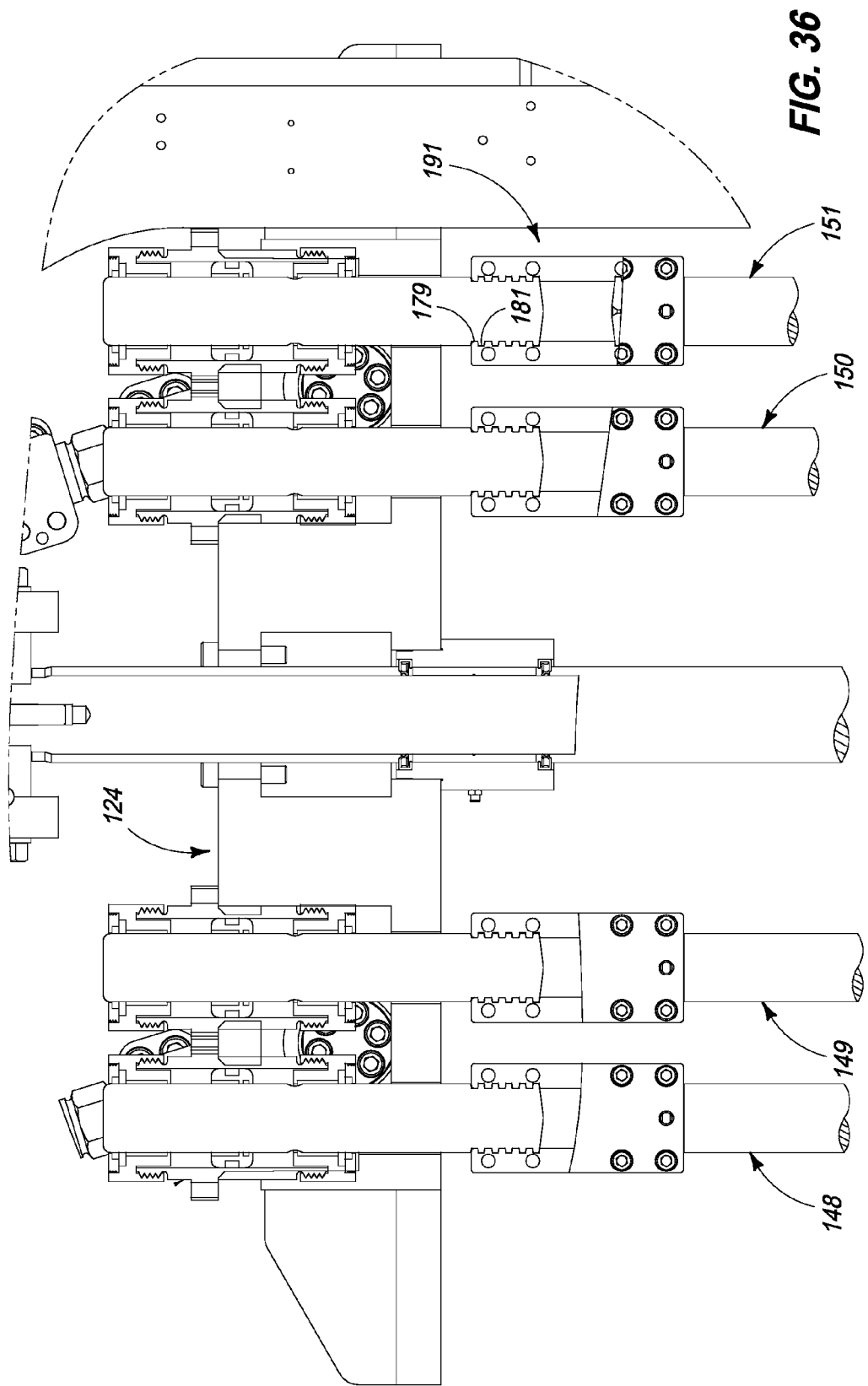
FIG. 36 is an enlarged partial side elevation view of the upper platen and retrofit load shafts on the thermoforming machine of FIGS. 30-34 showing the load shaft splice connectors in partial breakaway.

FIG. 36 is an enlarged partial side elevation view of the upper platen and retrofit load shafts on the thermoforming machine of FIGS. 30-34 showing the load shaft splice connectors, or collars 191 in partial breakaway. Complementary ridges 179 and recesses 181 are shown along an inner diameter of each splice collar 191.

Figure 37:
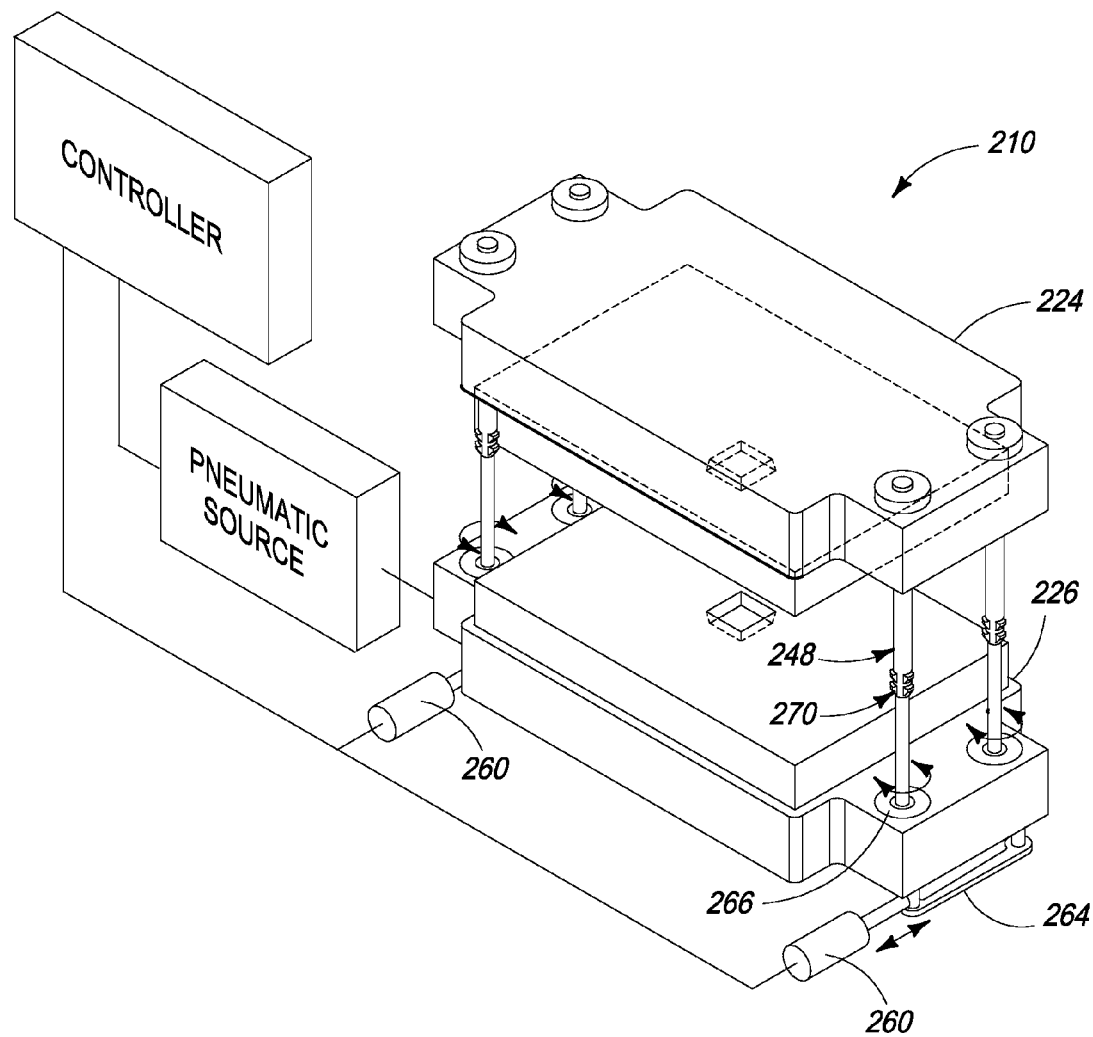
FIG. 37 is a simplified perspective view of yet another alternative embodiment thermoforming machine having lobbed stationary load shafts with rotating complementary locking collars for securing together engaged upper and lower die plates during a thermoforming operation.

FIG. 37 is a simplified perspective view of yet another alternative embodiment thermoforming machine 210 having lobbed stationary load shafts 248 with rotating complementary locking collars 266 for securing together engaged upper and lower platens 224 and 226, respectively, and associated die plates (not shown) during a thermoforming operation. Servo motors 260 drive a common kinematic linkage 264 to rotate collars 45 degrees between locked and unlocked positions.

Figure 38:
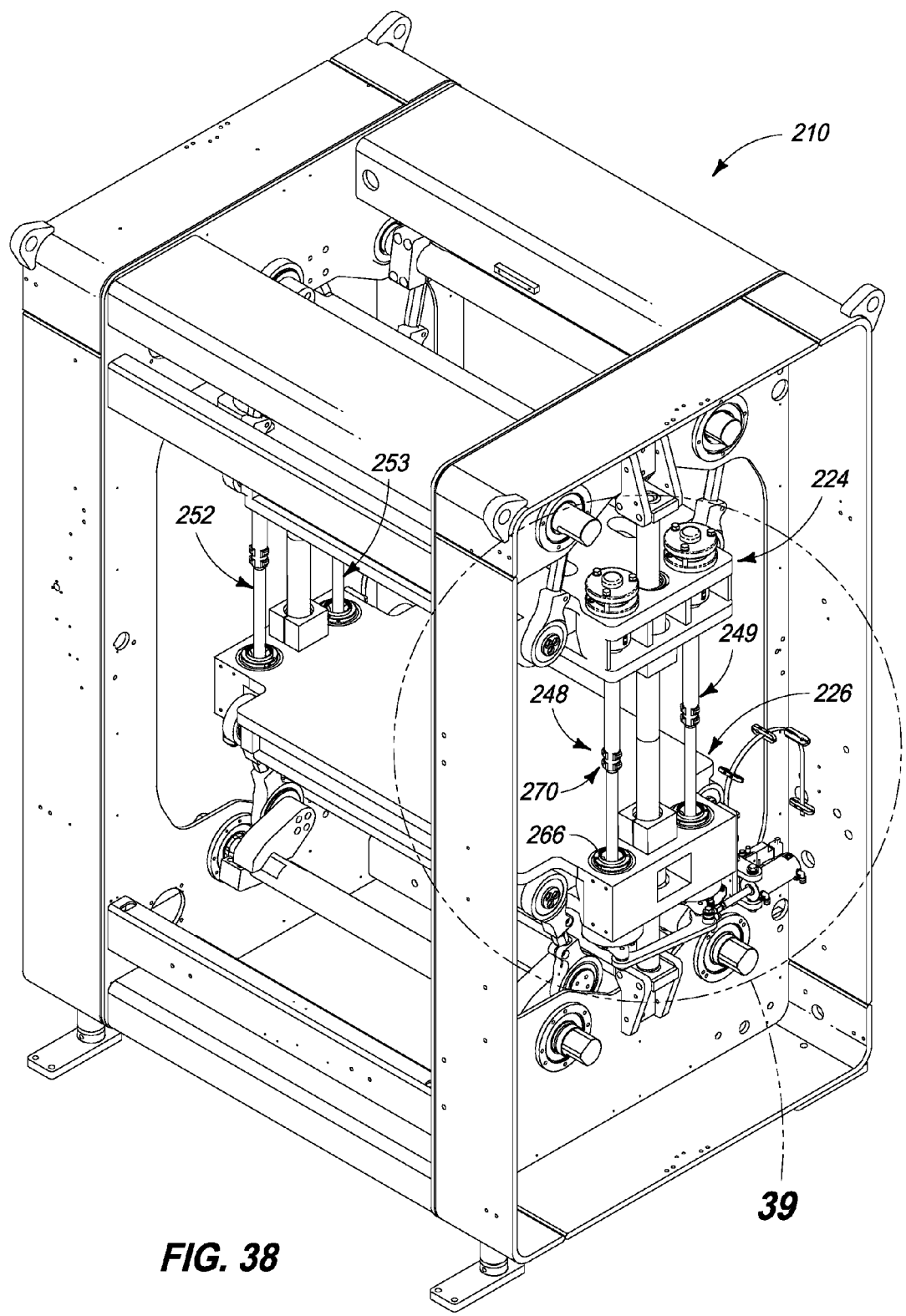
FIG. 38 is a perspective view from above in detail of the thermoforming machine of FIG. 37 showing the upper and lower platens moved apart with the load shafts and locking collars unlocked and separated.

FIG. 38 is a perspective view from above in detail of the thermoforming machine 210 of FIG. 37 showing the upper and lower platens 224 and 226 moved apart with the load shafts 248, 249 and 252, 253 and locking collars 266 unlocked and separated. An array or radially outwardly extending engagement lobes 270 are integrally formed in each load shaft, configured to lock and unlock with a complementary respective array of lobes extending in a radially inward direction within each collar 266.

Figure 39:
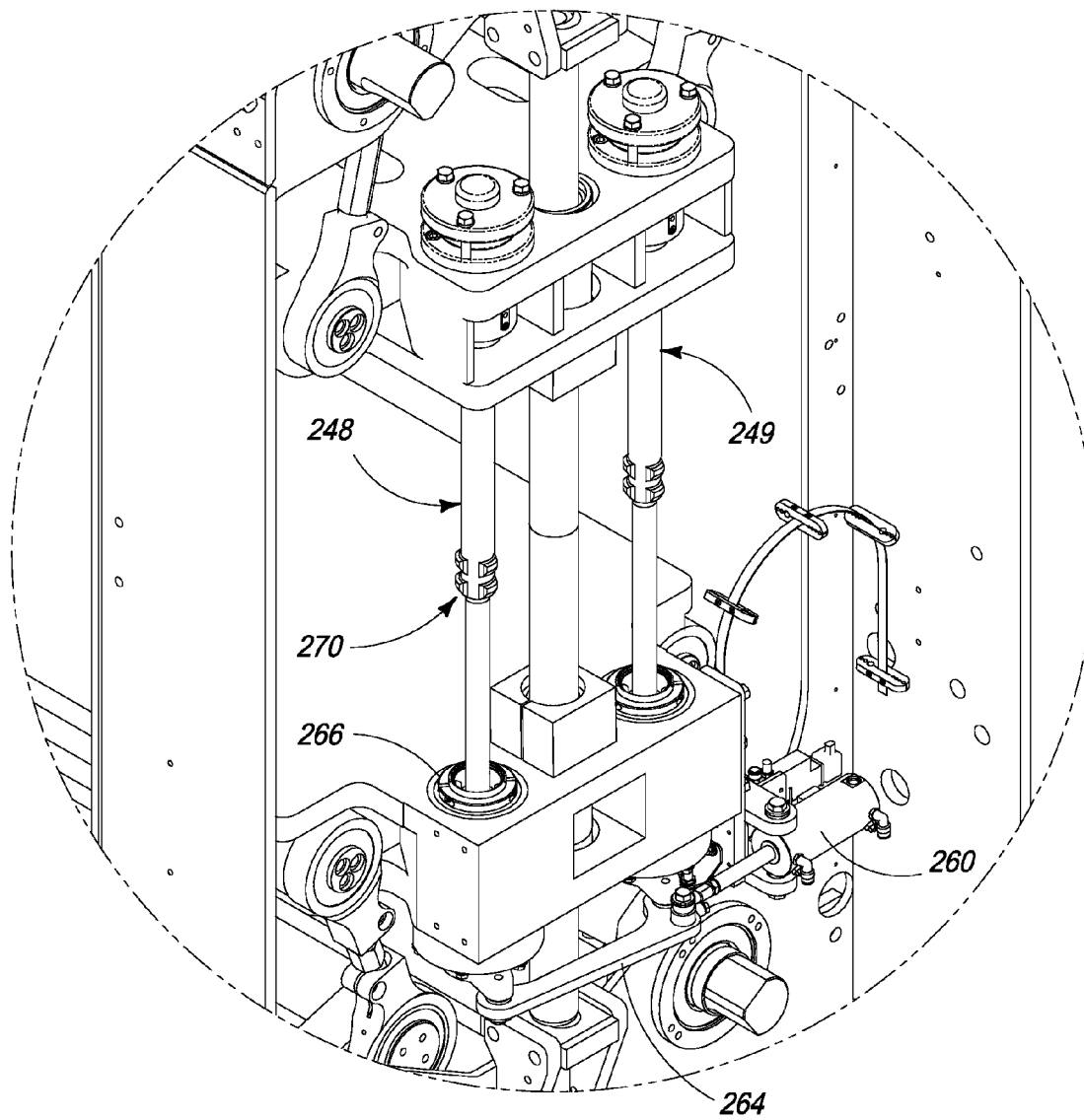
FIG. 39 is an enlarged view taken from the encircled region 39 of FIG. 38.

FIG. 39 is an enlarged view taken from the encircled region 39 of FIG. 38 further showing collars 266 unlocked from respective radial arrays of engagement lobes on each load shaft 248 and 249.

Figure 40:
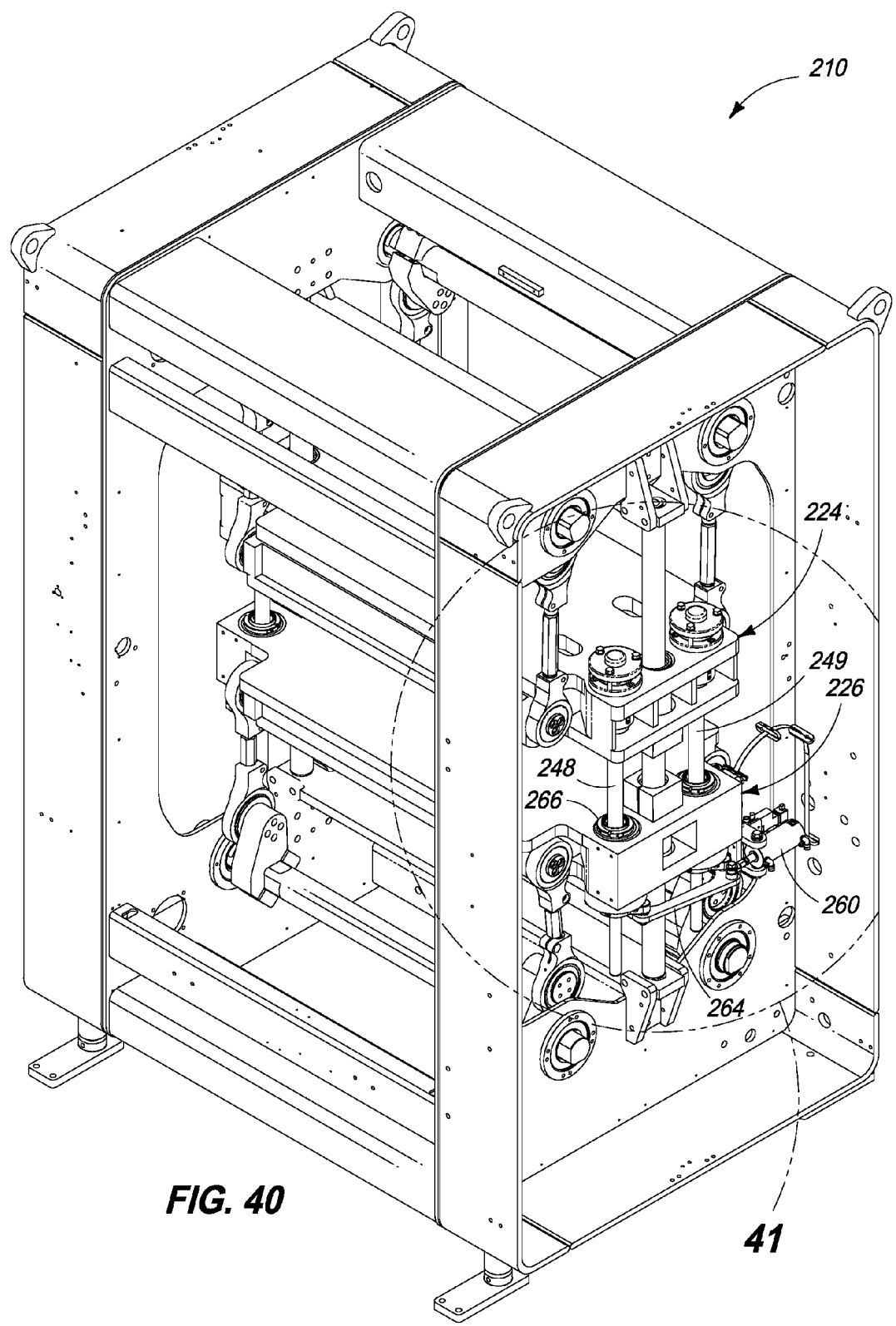
FIG. 40 is a perspective view from above in detail of the thermoforming machine of FIG. 37 showing the upper and lower platens moved together with the load shafts and locking collars locked together in a position where the die plates (not shown) would be engaged together during a thermoforming operation.

FIG. 40 is a perspective view from above in detail of the thermoforming machine of FIG. 37 showing the upper and lower platens 224 and 226 moved together with the load shafts 248 and 249 and locking collars 266 rotated 45 degrees and locked together in a position where the die plates (not shown) would be engaged together during a thermoforming operation.

Figure 41:
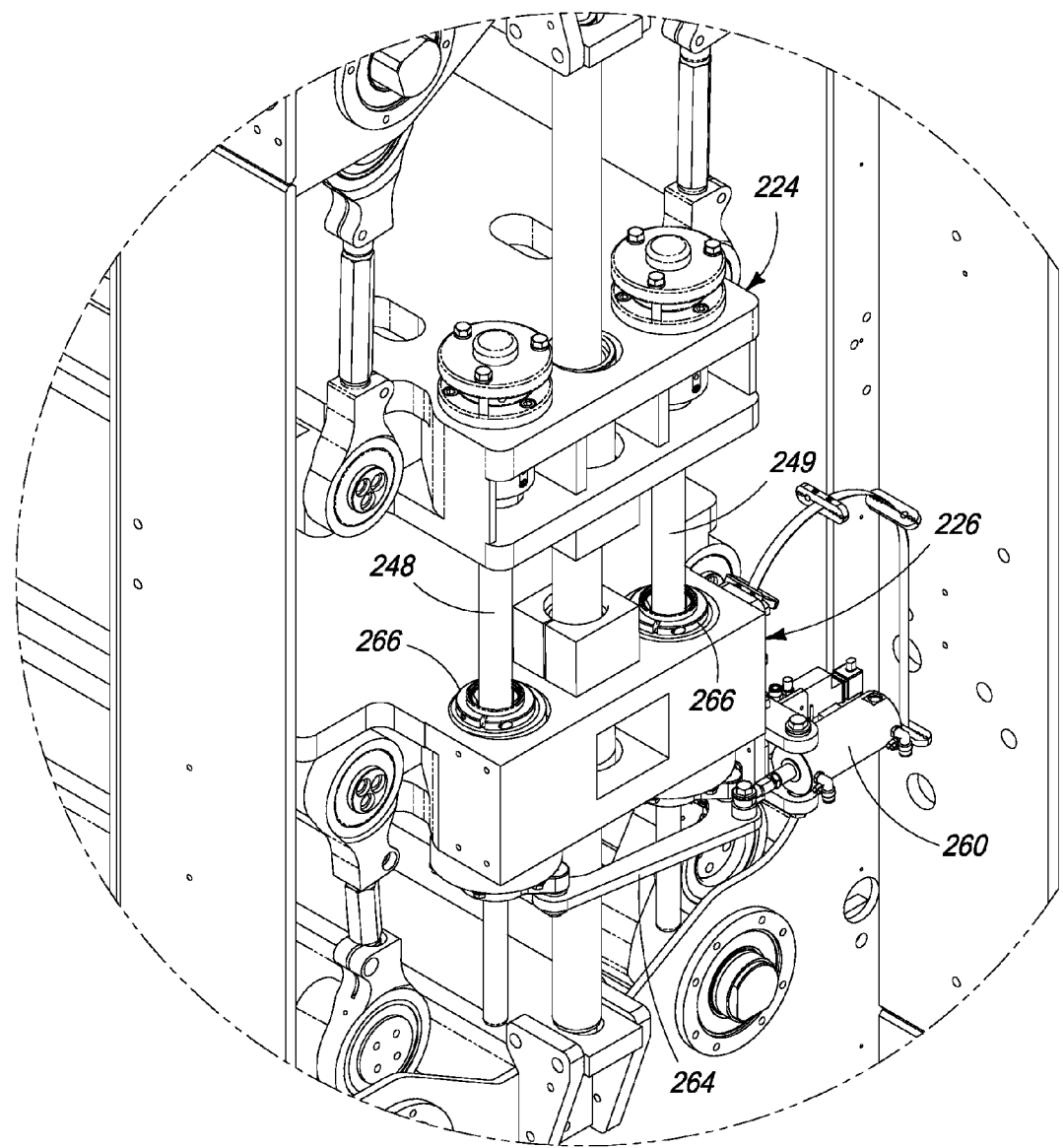
FIG. 41 is an enlarged view taken from the encircled region 41 of FIG. 40.

FIG. 41 is an enlarged view taken from the encircled region 41 of FIG. 40 further showing each collar rotated into a locked position with each load shaft.

Figure 42:
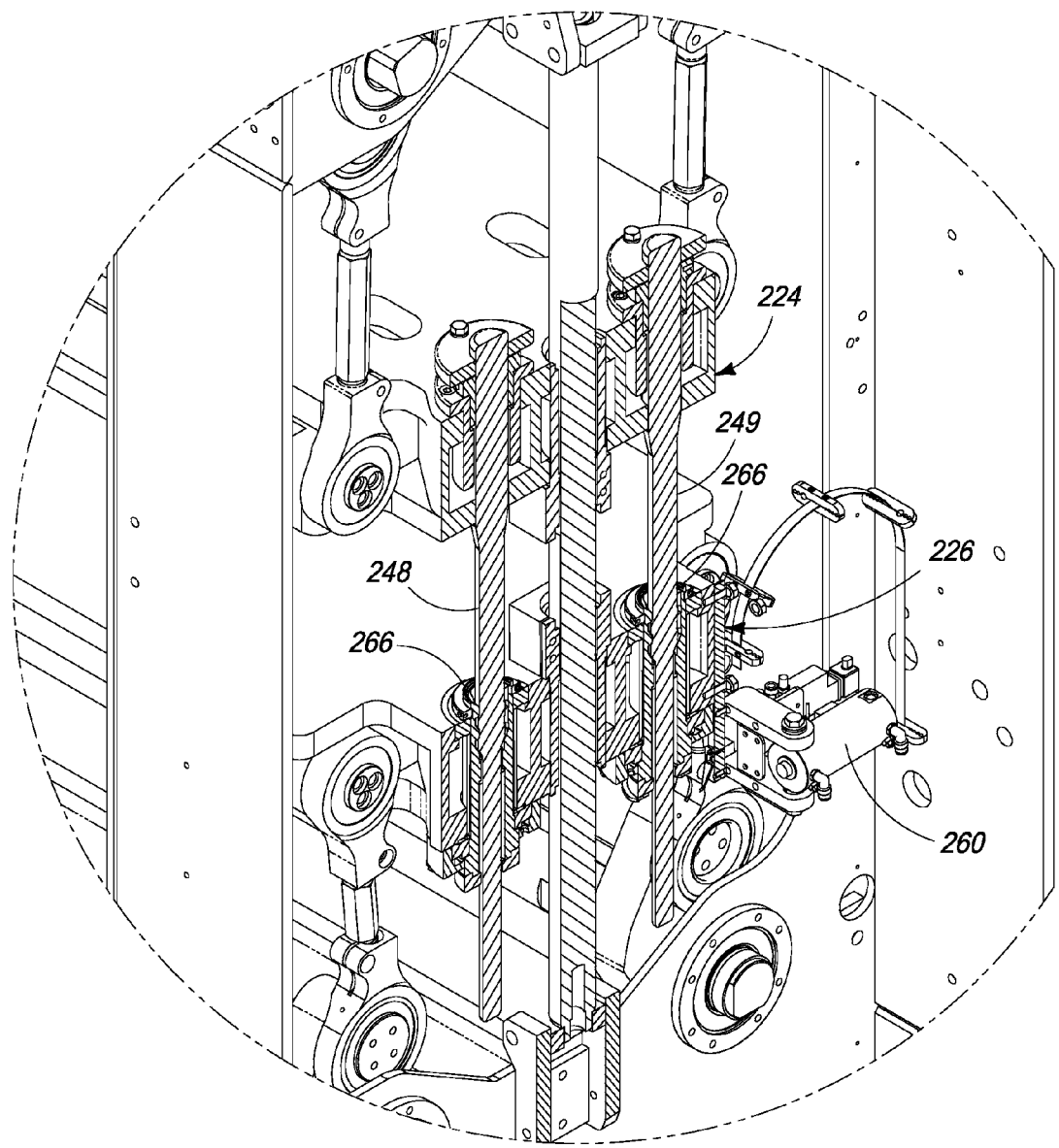
FIG. 42 is an enlarged view taken in vertical section through the load shafts and corresponding with the view of FIG. 41.

FIG. 42 is an enlarged view taken in vertical section through the load shafts and corresponding with the view of FIG. 41. Top platen 224 supports load shafts 248 and 249. Rotated collars 266 lock onto each load shaft so as to lock together (under load) platens 224 and 226.

Figure 43:
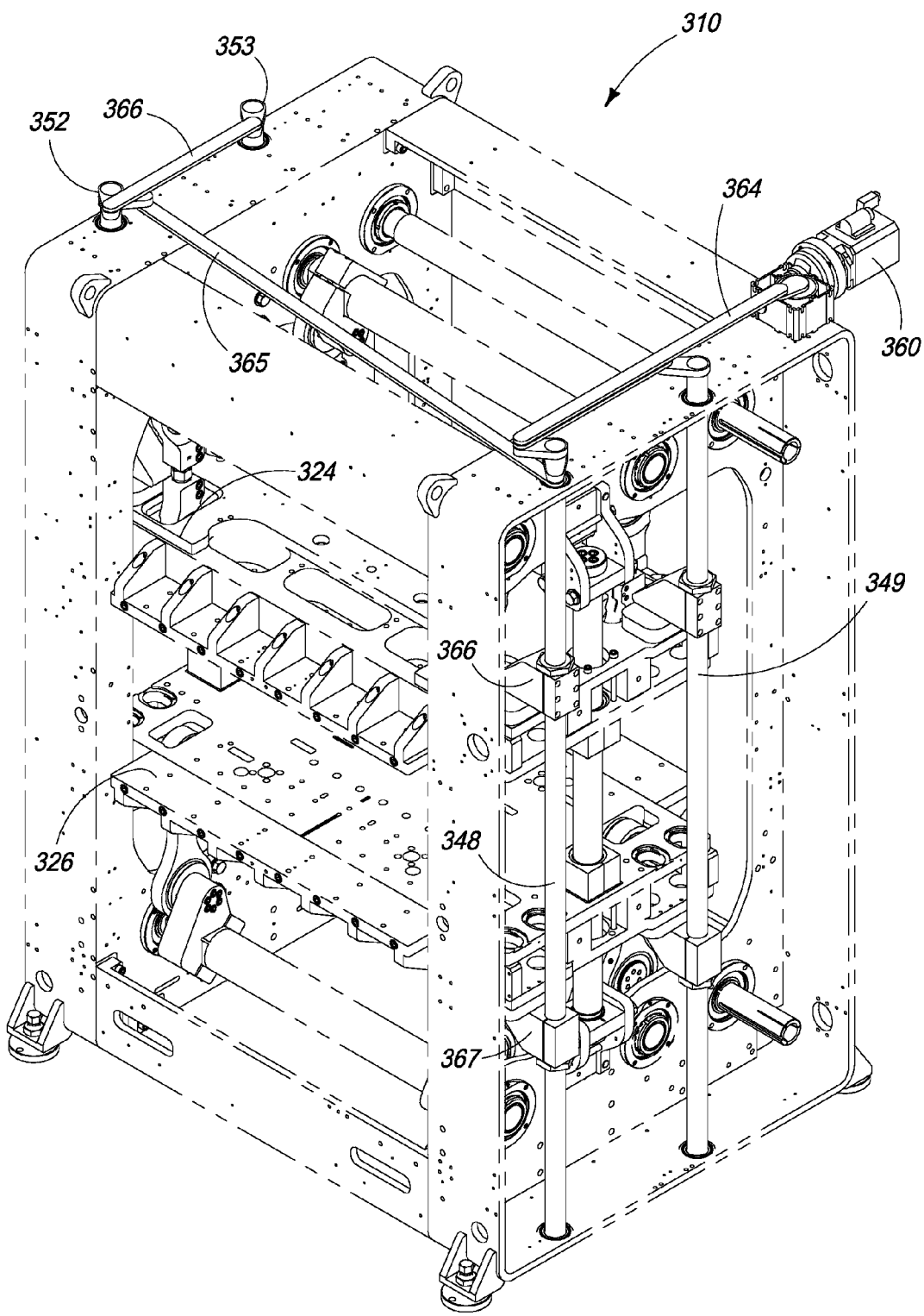
FIG. 43 is a perspective view of yet even another embodiment thermoforming machine having rotating load shafts each with a pair of dog legs, or arms that rotate to lock together the platens during a thermoforming operation and showing the dog legs rotated to a closed, or locked position.

FIG. 43 is a perspective view of yet even another embodiment thermoforming machine 310 having rotating load shafts 348 and 349 each with a pair of dog legs, or arms 366 and 367 that rotate to lock together the platens 324 and 326 during a thermoforming operation and showing the dog legs 366 and 367 rotated to a closed, or locked position.

Figure 44:
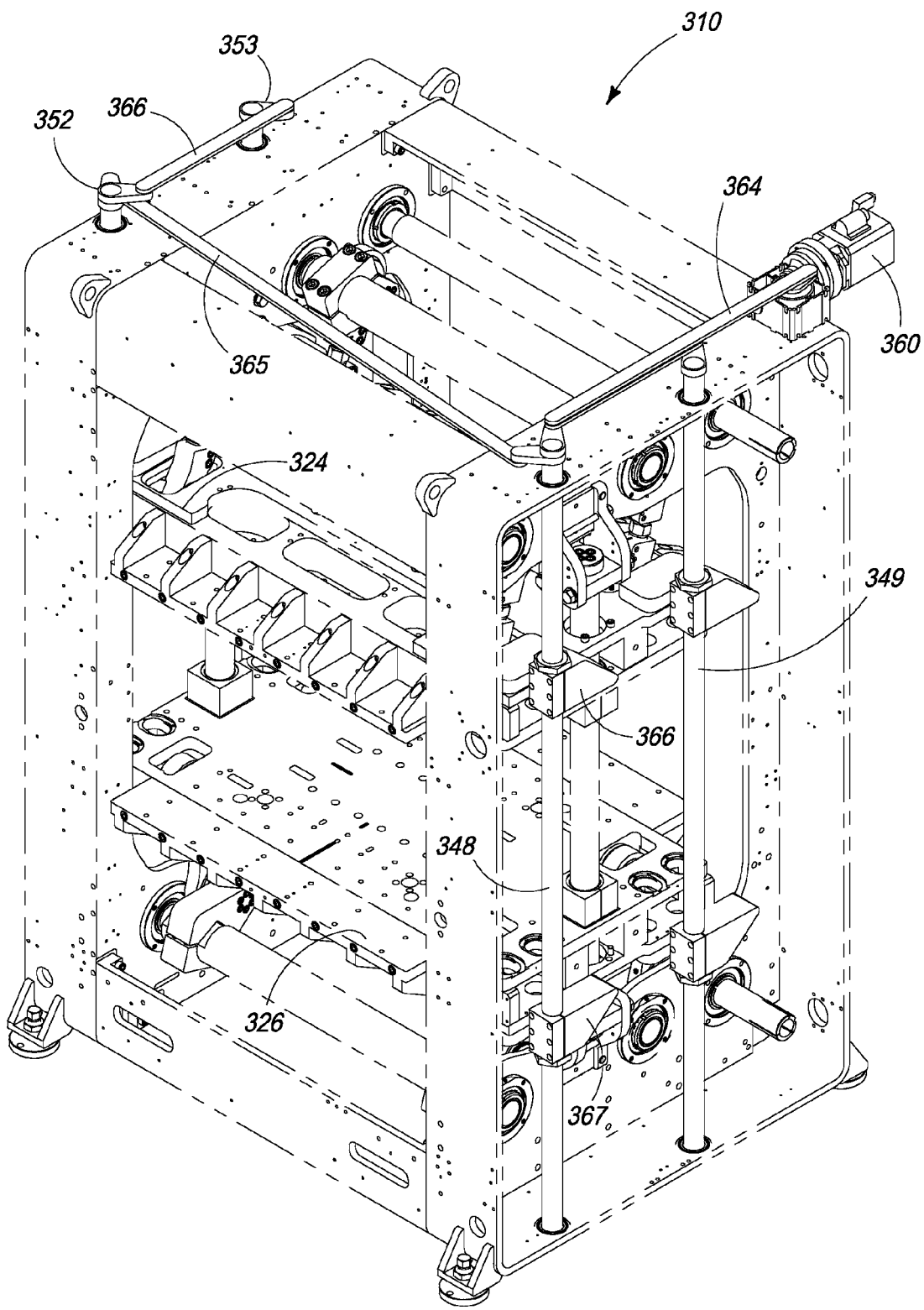
FIG. 44 is a perspective view of the thermoforming machine of FIG. 43 showing the dog legs rotated to an open, unlocked position.

FIG. 44 is a perspective view of the thermoforming machine of FIG. 43 showing the dog legs 366 and 367 rotated to an open, unlocked position. In this mode, platens 324 and 326 can be moved apart.

Figure 45:
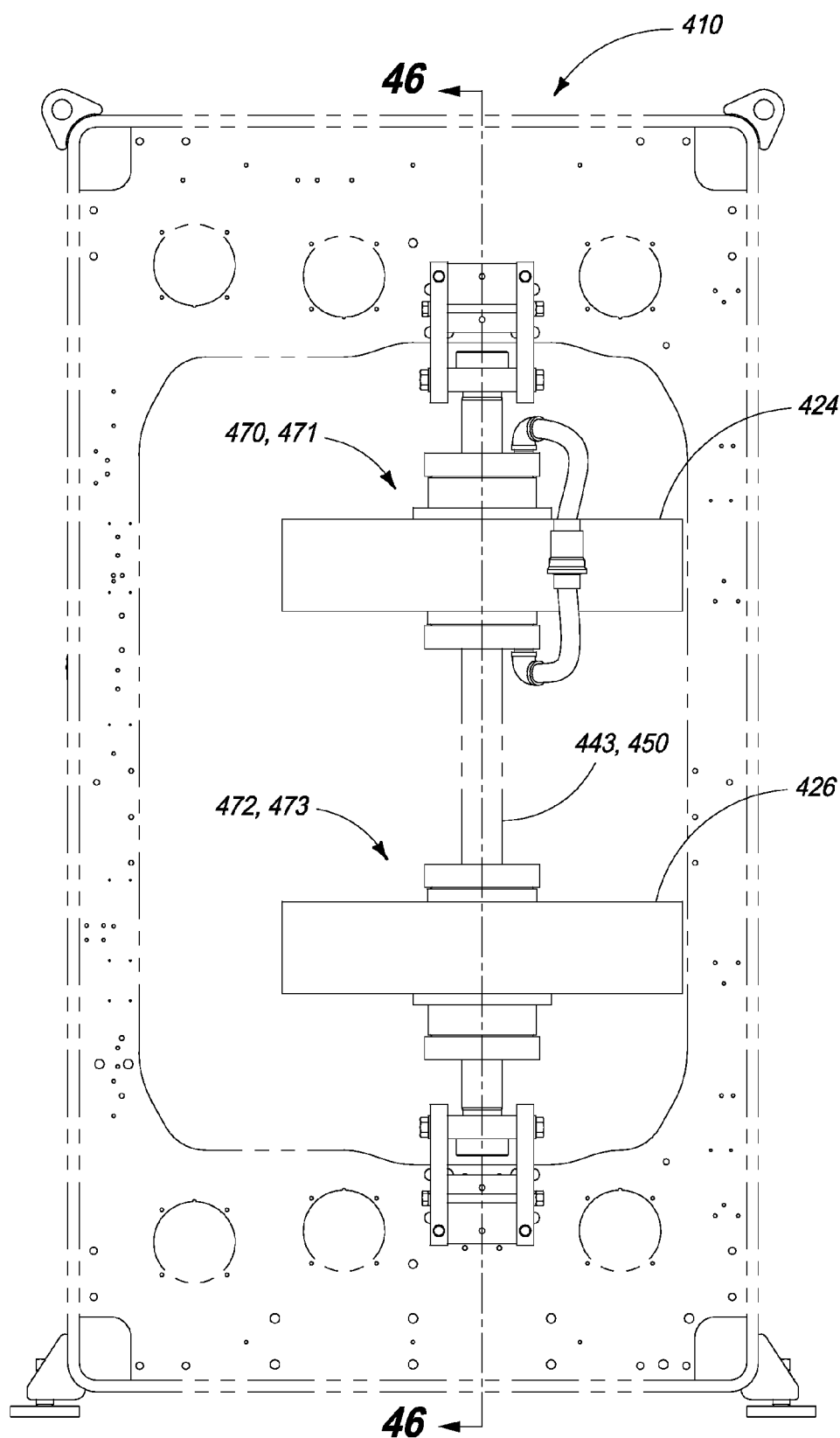
FIG. 45 is a die elevational view of an even further embodiment thermoforming machine showing a hydraulic lock system for locking and releasing upper and lower platens.

FIG. 45 is a side elevation view of an even further embodiment thermoforming machine 410 showing a hydraulic lock system for locking and releasing upper and lower platens. More particularly, top platen 424 and lower platen 426 are moved together and apart using pairs of hydraulic pistons 470. 471 and 472, 473 along shafts 448 and 450.

Figure 46:
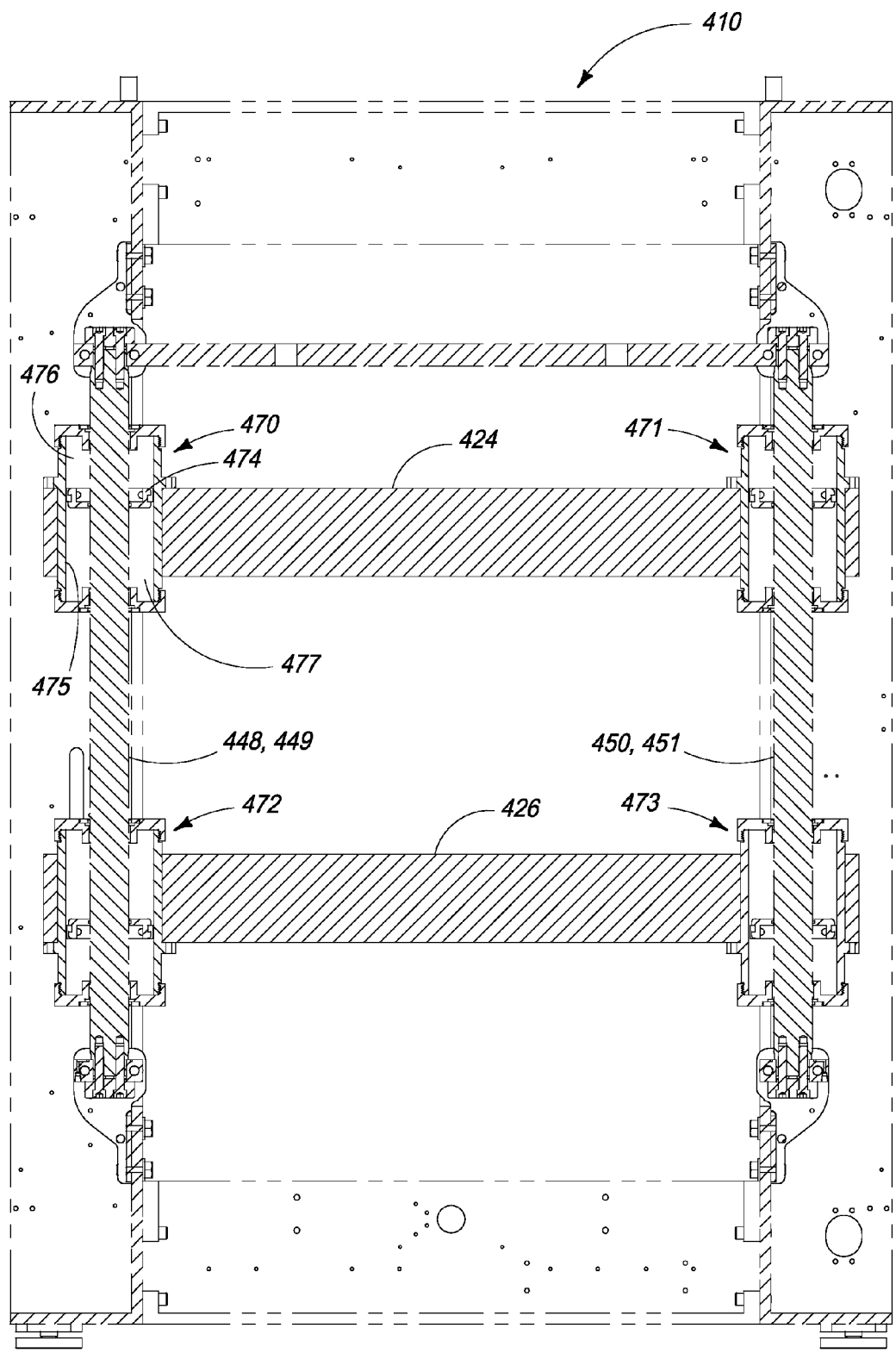
FIG. 46 is a vertical sectional view of the hydraulic lock system of FIG. 45 taken along line 46-46 of FIG. 45.

FIG. 46 is a vertical sectional view of the hydraulic lock system of FIG. 45 taken along line 46-46 of FIG. 45. A stationary piston 474 is affixed to a respective shaft 448-451. A hydraulic cylinder 470-473 is formed about each piston 474. Movement of fluid between chambers above and below each fixed piston will move the respective platen 424 and 426 up and down. By closing a valve and stopping fluid flow, each platen 424 and 426 can be locked into a position, such as a closed position.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:
1. A thermoforming machine, comprising:
a frame;
a first platen configured to support a first mold;
a second platen configured to support a complementary second mold and carried by the frame for movement toward and away from the first platen to engage and disengage with the first mold and further configured to intermittently receive forming pressure against a heated thermoformable web to drive the web toward the first platen during a forming operation;

an axial guide mechanism carried by the frame and configured to guide at least one of the first platen and the second platen;

a platen load shaft configured to extend linearly between the first platen and the second platen and having a notch configured to extend medially inwardly of the load shaft to provide a lock ledge with an engagement surface transverse to the load shaft, the load shaft supported by the frame and extending between the first platen and the second platen, the load shafts configured to form temporary load bearing paths between the first platen and the second platen as forming pressure is applied, and rendering the load shafts intermittently as the primary load path between the first platen and the second platen; and a load shaft latch having an engagement surface transverse to a central axis of the load shaft and movable to engage and disengage the lock ledge transverse engagement surface.

2. The thermoforming machine of claim 1, further comprising a seal provided between the first mold and the second mold.

3. The thermoforming machine of claim 2, further comprising a pneumatic pressure source in fluid communication with a forming surface of one of the first mold and the second mold.

4. The thermoforming machine of claim 1, wherein the load shaft is a cylindrical load shaft, the lock ledge is a reduced diameter portion of the load shaft, and the engagement surface comprises a cylindrical abutment surface.

5. The thermoforming machine of claim 1, wherein the load shaft latch comprises a sliding plate having an elongated aperture having a narrowed portion and an enlarged portion, the narrowed portion configured to provide an axisymmetric load path between the sliding plate and the platen load shaft via the notch when the plate is slide to an overlap position about the notch.

6. The thermoforming machine of claim 5, wherein the engagement surface of the load shaft latch is provided by an adjacent periphery of the narrowed portion of the aperture.

7. The thermoforming machine of claim 5, wherein the enlarged portion of the aperture in the sliding plate is sized to provide clearance for the platen load shaft to accommodate axial reciprocation of the load shaft relative to the load shaft latch.

8. The thermoforming machine of claim 5, wherein the load shaft latch further comprises a stationary plate nested with the sliding plate and supported for transverse movement between the stationary plate and the moving plate, the stationary plate having a clearance aperture sized to receive the load shaft for axial reciprocation.

9. The thermoforming machine of claim 8, wherein the stationary plate and the moving plate each have a sloped surface configured to mate in sliding relation with one another, such that stacked thickness of the stationary plate and the sloped plate increase and decrease, respectively as the moving plate is reciprocated to-and-fro relative to the stationary plate.

10. A thermoforming machine, comprising:
a frame;
a first platen supported by the frame;
a second platen movable to-and-fro relative to the first platen and further configured to intermittently receive forming pressure against a heated thermoformable web to drive the web toward the first platen during a forming operation;
a first die supported by the first platen;

a second die supported by the second platen;
a die post carried by the frame and configured to guide at least one of the first platen and the second platen;
a cyclical drive mechanism carried by the frame and configured to move at least one of the platens to-and-fro relative to another of the platens;
a thermoforming load lock rod assembly having a plurality of elongate load shafts configured to extend linearly between the first platen and the second platen and having a notch configured to extend medially inwardly of the load shaft and complementary load shaft latches each configured to engage a respective notch and lock the second platen proximate the first platen during a web forming operation, the load shafts configured to form temporary load bearing paths between the first platen and the second platen as forming pressure is applied, reducing load on the cyclical drive mechanism from the forming pressure and rendering the load shafts intermittently as the primary load path between the first platen and the second platen;
a manifold for receiving forming pressure between a web of material and one of the dies;
a seal provided between the web and the one die; and
a pneumatic pressure source for delivering forming pressure to one side of heated web of thermoformable material.

11. The thermoforming machine of claim 10, wherein the load shaft comprises a cylindrical load shaft, the lock ledge is a reduced diameter portion of the load shaft, and the engagement surface comprises a cylindrical abutment surface configured to provide an axisymmetric load path with a respective one of the load shaft latches.

12. The thermoforming machine of claim 10, wherein the load shaft latch comprises a sliding plate having an elongated aperture having a narrowed portion and an enlarged portion, and wherein the engagement surface of the load shaft latch is provided by an adjacent periphery of the narrowed portion of the aperture.

13. The thermoforming machine of claim 12, wherein the enlarged portion of the aperture in the sliding plate is sized to provide clearance for the platen load shaft to accommodate axial reciprocation of the load shaft relative to the load shaft latch.

14. The thermoforming machine of claim 10, wherein the load shaft latch further comprises a stationary plate nested with the sliding plate and supported for transverse movement between the stationary plate and the moving plate, the stationary plate having a clearance aperture sized to receive the load shaft for axial reciprocation.

15. The thermoforming machine of claim 10 wherein the seal is provided by a heated web of thermoformable material received between the first die and the second die during a thermoform operation.

16. A thermoforming apparatus, comprising:
a frame;
a first platen configured to support a first mold and carried by the frame;
a second platen configured to support a complementary second mold and carried by the frame for movement toward and away from the first platen and further configured to intermittently receive forming pressure against a heated thermoformable web to drive the web toward the first platen during a forming operation;
a die post carried by the frame and configured to guide at least one of the first platen and the second platen;
a platen load shaft configured to extend linearly between the first platen and the second platen and having a notch configured to extend medially inwardly of the load shaft to provide an engagement surface extending across the load shaft, supported by the frame, and extending between the first platen and the second platen, the load shaft configured to form a temporary load bearing path between the first platen and the second platen as forming pressure is applied, and rendering the load shafts intermittently as the primary load path between the first platen and the second platen; and a load shaft latch having a complementary engagement surface positionable relative to the load shaft in movable relation to engage and disengage with the platen load shaft engagement surface.

17. The thermoforming apparatus of claim 16, wherein the engagement surface of the platen load shaft is provided by a lock ledge having a circumferential shelf configured to provide an axisymmetric load path with the complementary engagement surface of the load shaft latch.

18. The thermoforming apparatus of claim 17, wherein the complementary engagement surface of the load shaft latch is provided by a key plate having a key slot configured to engage and disengage with the circumferential shelf of the lock ledge.

19. The thermoforming apparatus of claim 16, wherein the engagement surface of the platen load shaft is provided by a lobe on the load shaft.

20. The thermoforming apparatus of claim 19, wherein the complementary engagement surface of the load shaft latch is provide by a complementary locking collar rotationally positionable to lock and unlock with the platen load shaft engagement surface.

* * * * *